(12) United States Patent
Baer et al.

(10) Patent No.: US 9,558,888 B2
(45) Date of Patent: Jan. 31, 2017

(54) MULTILAYER POLYMER FILM HAVING A CHARGE-DELOCALIZING INTERFACE

(71) Applicants: Case Western Reserve University, Cleveland, OH (US); The U.S.A. as Represented by the Secretary of the Navy, Washington, DC (US)

(72) Inventors: Eric Baer, Cleveland Heights, OH (US); Anne Hiltner, Cleveland, OH (US); James S. Shirk, Alexandria, VA (US); Mason A. Wolak, Alexandria, VA (US)

(73) Assignee: The Government of the United States of America, As Represented by Secretary of the Navy, Washington, DC (US)

(*) Notice: Subject to any disclaimer, the term of this patent is extended or adjusted under 35 U.S.C. 154(b) by 270 days.

(21) Appl. No.: 14/082,798

(22) Filed: Nov. 18, 2013

(65) Prior Publication Data

US 2014/0160623 A1    Jun. 12, 2014

Related U.S. Application Data

(63) Continuation-in-part of application No. 12/580,816, filed on Oct. 16, 2009, now Pat. No. 8,611,068.

(Continued)

(51) Int. Cl.
*H01G 4/18*    (2006.01)
*B32B 7/02*    (2006.01)
(Continued)

(52) U.S. Cl.
CPC ............. *H01G 4/18* (2013.01); *B29C 47/0021* (2013.01); *B32B 7/02* (2013.01); *B32B 15/08* (2013.01);
(Continued)

(58) Field of Classification Search
CPC ............ H01G 4/18; H01G 4/20; B32B 27/308
See application file for complete search history.

(56) References Cited

U.S. PATENT DOCUMENTS

| | | | | |
|---|---|---|---|---|
| 5,077,122 A | * | 12/1991 | Yen | ........................ H01B 3/426 428/220 |
| 5,636,100 A | * | 6/1997 | Zheng | ...................... H01G 4/20 361/311 |

(Continued)

OTHER PUBLICATIONS

Mueller et al., Microlayer Coextrusion: Processing and Applications, 1997, Polymer Process Engineering 97.*

*Primary Examiner* — David M Sinclair
(74) *Attorney, Agent, or Firm* — Taolli, Sungheim, Covell & Tummino LLP

(57) ABSTRACT

A multilayer polymer dielectric film includes a stack of coextruded, alternating first dielectric layers and second dielectric layers that receive electrical charge. The first dielectric layers include a first polymer material and the second dielectric layers include a second polymer material different from the first polymer material. The first polymer material has a permittivity greater than the second polymer material. The second polymer material has a breakdown strength greater than the first polymer material. Adjoining first dielectric layers and second dielectric layers define an interface between the layers that delocalizes electrical charge build-up in the layers. The stack has substantially the crystallographic symmetry before and during receiving electrical charge.

12 Claims, 21 Drawing Sheets

Related U.S. Application Data

(60) Provisional application No. 61/106,017, filed on Oct. 16, 2008, provisional application No. 61/773,597, filed on Mar. 6, 2013.

(51) Int. Cl.

| | | |
|---|---|---|
| *B32B 15/08* | (2006.01) | |
| *B32B 27/08* | (2006.01) | |
| *H01G 4/20* | (2006.01) | |
| *B32B 27/30* | (2006.01) | |
| *B32B 27/36* | (2006.01) | |
| *B29C 47/00* | (2006.01) | |
| *B29C 47/06* | (2006.01) | |
| *B29L 7/00* | (2006.01) | |
| *B29L 9/00* | (2006.01) | |
| *B29L 31/34* | (2006.01) | |

(52) U.S. Cl.
CPC ............. *B32B 27/08* (2013.01); *B32B 27/308* (2013.01); *B32B 27/365* (2013.01); *H01G 4/20* (2013.01); *B29C 47/0019* (2013.01); *B29C 47/061* (2013.01); *B29C 47/065* (2013.01); *B29K 2995/0006* (2013.01); *B29L 2007/008* (2013.01); *B29L 2009/00* (2013.01); *B29L 2031/34* (2013.01); *B29L 2031/3406* (2013.01); *B29L 2031/3468* (2013.01); *B32B 2307/20* (2013.01); *B32B 2307/202* (2013.01); *B32B 2307/204* (2013.01); *B32B 2307/518* (2013.01); *B32B 2439/70* (2013.01); *B32B 2457/00* (2013.01); *Y10T 428/24942* (2015.01)

(56) References Cited

U.S. PATENT DOCUMENTS

| | | | | |
|---|---|---|---|---|
| 5,759,467 | A * | 6/1998 | Carter | B29C 55/023 264/173.12 |
| 6,083,628 | A * | 7/2000 | Yializis | B05D 1/60 428/461 |
| 2001/0043398 | A1 * | 11/2001 | Baer | B29C 47/065 359/588 |
| 2007/0108490 | A1 * | 5/2007 | Tan | H01G 4/20 257/296 |
| 2011/0110015 | A1 * | 5/2011 | Zhang | H01G 4/20 361/311 |

\* cited by examiner

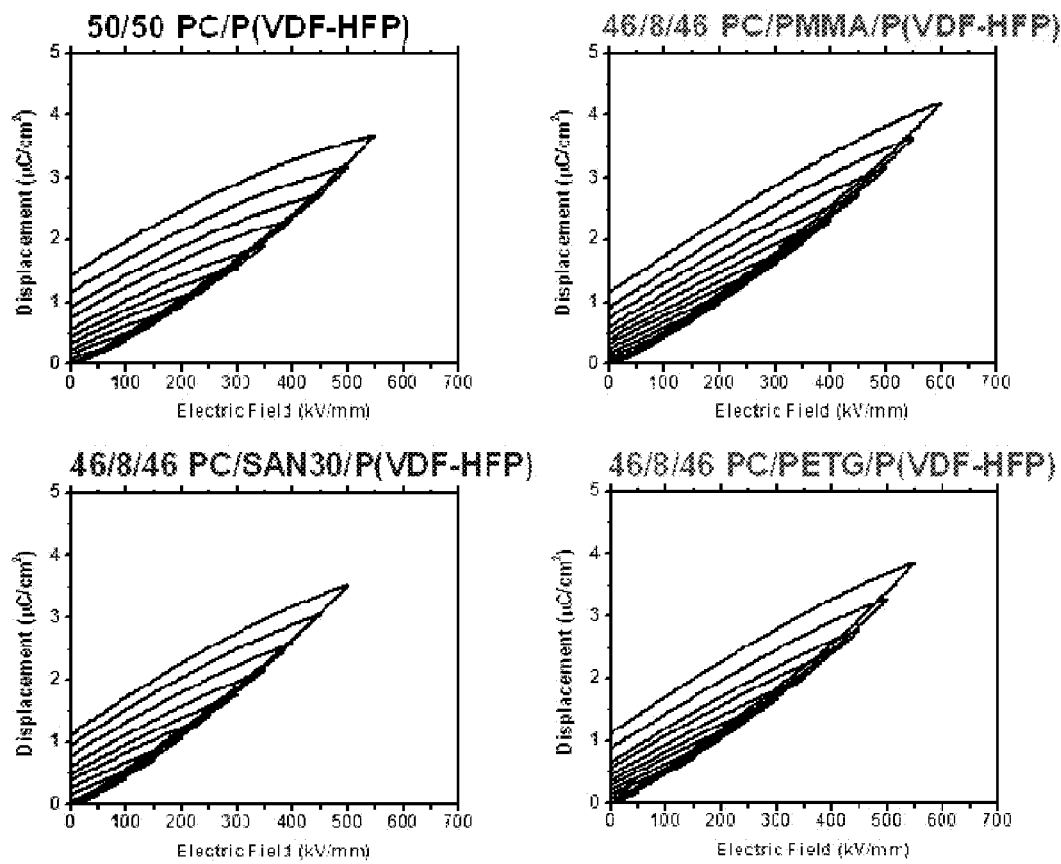
Figs. 13A-F

Figs. 18A-B

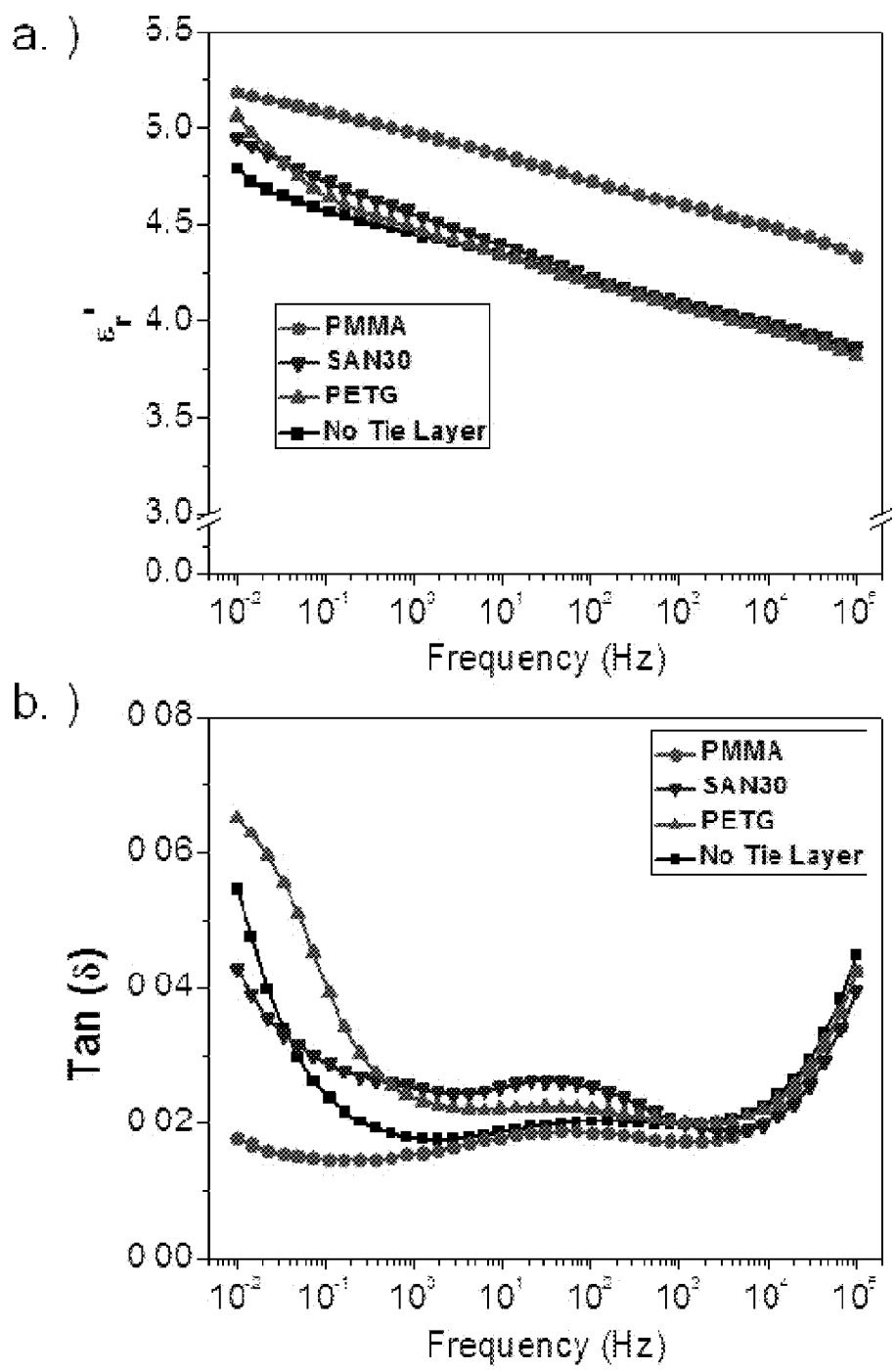
Figs. 24A-B

MULTILAYER POLYMER FILM HAVING A CHARGE-DELOCALIZING INTERFACE

RELATED APPLICATION

This application is a continuation-in-part of U.S. Non-provisional application Ser. No. 12/580,816, filed Oct. 16, 2009, which claims priority from U.S. Provisional Application No. 61/106,017, filed Oct. 16, 2008, and also claims priority from U.S. Provisional Application No. 61/773,597, filed Mar. 6, 2013, the subject matter of which are all incorporated herein by reference in their entirety.

GOVERNMENT FUNDING

This invention was made with government support under Grant No. CON500535 awarded by The National Science Foundation. The United States government has certain rights to the invention.

TECHNICAL FIELD

The present invention relates to a dielectric film and, in particular, relates to a coextruded multilayer polymer dielectric film with enhanced electrical properties.

BACKGROUND

Capacitors employ low temperature thermoplastic dielectric thin film polymers, such as polypropylene (PP), polyethylene terephthalate (PET), polycarbonate, polyethylene-2,6-naphthalate, polyvinylidene difluoride (PVDF), polyphenylene oxide, and polyphenylene sulfide, either metallized or maintained between metal foil electrodes. Metalized film capacitors are used extensively in a broad range of electrical and electronic equipment that include motor run and motor start circuits for air conditioners, fluorescent and high intensity light ballasts, power supplies, telecommunication equipment, instrumentation, hybrid electric vehicles, grid convertors, pulsed power applications, and medical electronics. In many of these applications, the metallized capacitors are used to store energy.

SUMMARY

Embodiments described herein relate to a stack of coextruded, alternating first dielectric layers and second dielectric layers that can receive and store electrical charge. The first dielectric layers include a first polymer material and the second dielectric layers include a second polymer material different from the first polymer material. The first polymer material has a permittivity greater than the second polymer material. The second polymer material has a breakdown strength greater than the first polymer material. Adjoining first dielectric layers and second dielectric layers delocalizing electrical charge build-up in the layers. The stack can have substantially the same crystallographic symmetry before and during receiving electrical charge (e.g., does not behave as a piezoelectric material).

In an example, the first dielectric layers include PVDF, a copolymer thereof, or a composite thereof and the second dielectric layers include at least one of polypropylene (PP), polyethylene terephthalate (PET), polycarbonate (PC), poly(p-phenylene sulfide), copolymers thereof, or composites thereof.

Other embodiments described herein relate to a capacitor that includes a multilayer polymer dielectric film. The multilayer polymer dielectric film includes a plurality of alternating coextruded first dielectric layers, second dielectric layers, and tie layers interposed between the first and second dielectric layers forming a stack that receives electrical charge. The first dielectric layers include a first polymer material. The second dielectric layers include a second polymer material and the tie layers include a third polymer material. The first dielectric layers and the tie layers define first interfaces between the layers and the second dielectric layers and tie layers define second interfaces between the layers such that the multilayer polymer dielectric film exhibits at least one of a higher breakdown strength and a higher energy density than the breakdown strength and energy density of the first and second dielectric layers.

In an example, the first dielectric layers include at least one of poly(vinylidene fluoride-co-hexafluoropropylene) (P(VDF-HFP)) and poly(vinylidene fluoride-co-tetrafluoroethylene) (P(VDF-TFE)). The second dielectric layers include at least one of polypropylene (PP), polyethylene terephthalate (PET), polycarbonate (PC), poly(p-phenylene sulfide), copolymers thereof, or composites thereof. The tie layers include at least one of poly(methyl methacrylate) (PMMA), styrene-acrylonitrile copolymer containing 30 wt % acrylonitrile (SAN30), poly(ethylene-1,4-cyclohexylenedimethylene terephthalate) (PETG), copolymers thereof, or composites thereof.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIGS. 13(a)-(f) illustrate representative unipolar D-E hysteresis loops for 65-layer PC/PMMA/P(VDF-HFP) films with various PMMA layer thicknesses/compositions.

FIG. 24 illustrates measured a) dielectric constant, and b) dielectric loss tangent of various 46/8/46 PC/tie/P(VDF-HFP) 65-layer films.

DETAILED DESCRIPTION

Figure 1:
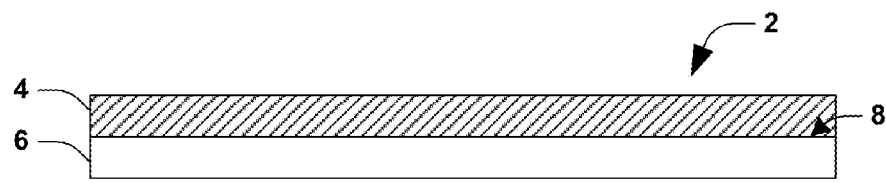
FIG. 1 is a schematic illustration of a multilayer polymer dielectric film in accordance with an embodiment.

Embodiments described herein to a multilayer polymer dielectric film and to electrical devices that include a multilayer polymer dielectric film (referred to as a multilayer film). Referring to FIG. 1, a two-component multilayer polymer dielectric film 2 includes a co-extruded first dielectric layer 4 and a second dielectric layer 6. The first dielectric layer 4 includes a first polymer material and the second dielectric layer 6 includes a second polymer material. The first dielectric layer 4 and the second dielectric layer 6 define an interface 8 that delocalizes charge build-up in the layers.

The two-component multilayer film can include a plurality of alternating first dielectric layers and second dielectric layers that are stacked to form the multilayer film. The polymer materials used to form the first dielectric layer and the second dielectric layer can include a polymer with desirable dielectric properties and a polymer with insulating properties that acts as a barrier to electrical breakdown. In one example, the first polymer material formed into the first dielectric layer can be chosen to have a high permittivity (e.g., greater than the permittivity of the second polymer material) but it need not have a high dielectric strength. The second polymer material formed into the second dielectric layer can be chosen to have a high breakdown strength (e.g., greater than the breakdown strength of the first polymer material). The first layers and the second layers can have various thicknesses, for example, about 5 to about 5000 nanometer (nm) that can be readily varied to adjust electric properties of the multilayer dielectric polymer film. When employed in a capacitor, the first layer(s) and second layer(s) are perpendicular to the electrical field thus maximizing the breakdown field or strength of the multilayer film by maximizing the barrier to electrical breakdown propagation presented by the second polymer material. Since the maximum stored energy density of dielectric materials is proportional to the effective permittivity times the square of the dielectric strength, the maximum stored energy density of the two-component multilayer film can substantially exceed that of either of the component polymer materials in their pure state.

Figure 2:
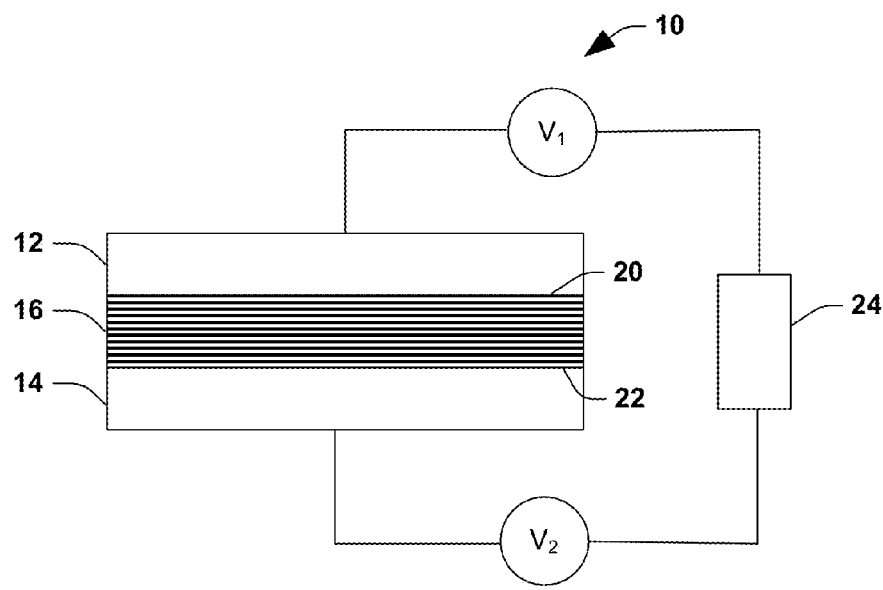
FIG. 2 is a schematic illustration of a capacitor in accordance with an embodiment.

FIG. 2 illustrates a schematic view of a capacitor 10 in accordance with an aspect of the invention. The capacitor 10 includes a first electrode 12, a second electrode 14, and a two-component multilayer polymer dielectric film 16. The multilayer polymer dielectric film 16 includes a first surface 20 and second surface 22 that is separated from and extends substantially parallel to the first surface 20. The multilayer polymer dielectric film 16 is sandwiched between the first electrode 12 and the second electrode 14 such that the first electrode 12 is provided on and in contact with the first surface 20 and the second electrode 14 is provided on and in contact with the second surface 22. The first electrode 12 can be coupled to first power source, and the second electrode 14 can be coupled to a second power source 2. The first source $V_1$ and the second power source $V_2$ can be coupled to a voltage source 24 capable of applying varying bias voltages to the electrodes 12 and 14.

Figure 3:
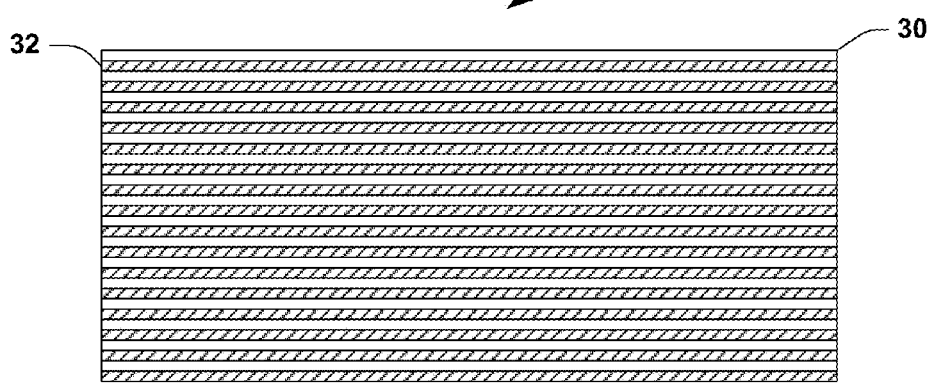
FIG. 3 is a schematic illustration of a multilayer polymer dielectric film of the capacitor of FIG. 2.

Referring to FIG. 3, in some embodiments the multilayer polymer dielectric film 16 in accordance with an aspect of the invention can include a plurality of alternating first dielectric layers 30 and second dielectric layers 32 of, respectively, a first polymer material and a second polymer material. The first dielectric layers 30 and the second dielectric layers 32 can be substantially parallel and stacked so that each first layer 30 is adjacent to at least one of the second layers 32 to define an interface between each adjacent layer pair. Each interface and/or the combination of interfaces can delocalize charge build up in the layers 30 and 32 and in the multilayer polymer dielectric film 16.

Figure 4:
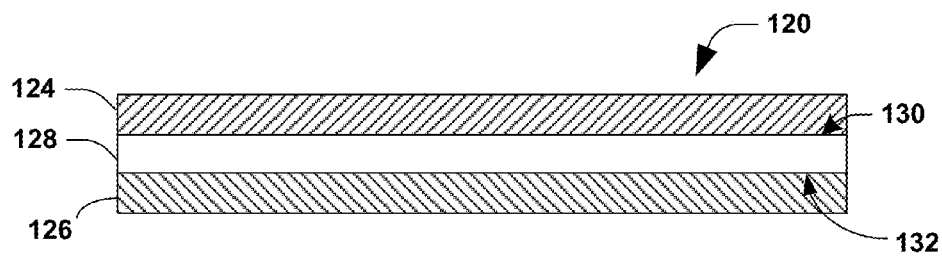
FIG. 4 is a schematic illustration of a multilayer polymer dielectric film in accordance with another embodiment.
Figure 5:
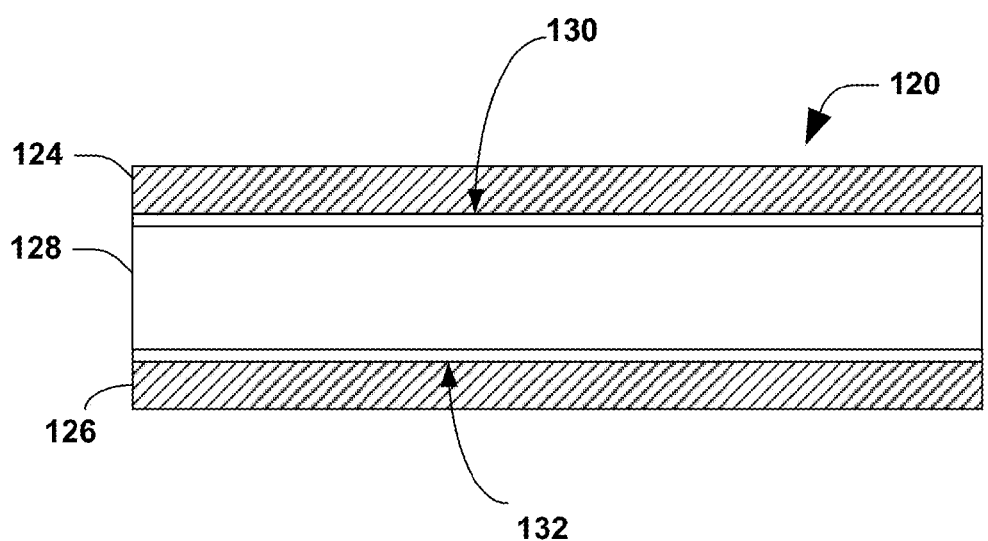
FIG. 5 is a schematic illustration of an enlarged portion of the multilayer polymer dielectric film of FIG. 4.

Referring to FIGS. 4 and 5, in other embodiments a three-component multilayer polymer dielectric film 120 can include a co-extruded first dielectric layer 124, second dielectric layer 126, and tie layer 128 interposed between the first and second dielectric layers. The tie layer 128 modifies the interface/interphase between the first and second dielectric layers 124, 126, which directly impacts the breakdown strength, dielectric loss, hysteresis, and energy density of the dielectric film 120. The first dielectric layer 124 includes a first polymer material. The second dielectric layer 126 includes a second polymer material. The tie layer 128 includes a third polymer material. In one example, the first, second, and third polymer materials are all different from one another.

The first dielectric layer 124 and the tie layer 128 define a first interface 130 between the layers. The second dielectric layer 126 and tie layer 128 define a second interface 132 between the layers. Referring to FIG. 5, the first interface 130 constitutes an interphase region in which the first dielectric layer 124 and tie layer 128 are interdiffused into one another. The first interface 130 has a thickness designated generally by $t_1$. The second interface 132 constitutes an interphase region in which the second dielectric layer 126 and tie layer 128 are interdiffused into one another. The second interface 132 has a thickness designated generally by $t_2$. The thicknesses $t_1$, $t_2$ of the first and second interfaces 130, 132 may be the same or may be different from one another.

The three-component multilayer film can include a plurality of alternating first dielectric layers, second dielectric layers, and tie layers that are stacked to form the multilayer film. The polymer materials used to form the first dielectric layer and the second dielectric layer can include a polymer with desirable dielectric properties and a polymer with insulating properties that acts as a barrier to electrical breakdown. In one example, the first polymer material formed into the first dielectric layer can be chosen to have a high permittivity (e.g., greater than the permittivity of the second polymer material) but it need not have a high dielectric strength. The second polymer material formed into the second dielectric layer can be chosen to have a high breakdown strength (e.g., greater than the breakdown strength of the first polymer material).

The third polymer material formed into the tie layer can be chosen to have desired adhesion characteristics with the first and second dielectric layers, which affects the layer interface, level of interdiffusion between layers, and dielectric properties of the multilayer film. The third polymer material can be selected based upon the thermodynamic interaction with the first and second polymer materials. The third polymer material can also be selected to enhance or decrease the adhesion/interaction between the first and second polymer materials, thereby directly influencing the dielectric properties of the three-component dielectric film. For example, the charge buildup/distribution of each layer interface is reduced with a third polymer material that has a moderate to high level of interaction and/or miscibility with both the first and second polymer materials.

The first dielectric layers, second dielectric layers, and tie layers can each have various thicknesses, for example, from about 5 nm to about 5000 nm, that can be readily varied to adjust electric properties of the three-component multilayer film. When employed in a capacitor, the first dielectric layer(s), second dielectric layer(s), and tie layer(s) extend perpendicular to the electrical field, thereby maximizing the breakdown field or strength of the three-component multilayer film by maximizing the barrier to electrical breakdown propagation presented by the second polymer material. Since the maximum stored energy density of dielectric materials is proportional to the effective permittivity times the square of the dielectric strength, the maximum stored energy density of the three-component multilayer film can substantially exceed that of any of the component polymers in their pure state.

Figure 6:
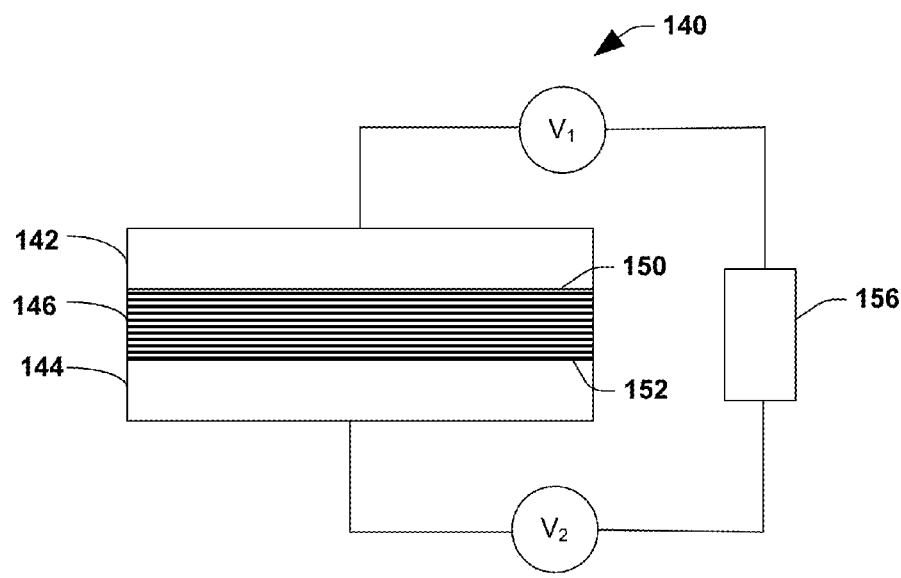
FIG. 6 is a schematic illustration of a capacitor in accordance with an embodiment.

FIG. 6 illustrates a schematic view of a capacitor 140 in accordance with another embodiment. The capacitor 140 includes a first electrode 142, a second electrode 144, and a three-component multilayer polymer dielectric film 146. The multilayer polymer dielectric film 146 includes a first surface 150 and second surface 152 that is separated from and extends substantially parallel to the first surface. The multilayer polymer dielectric film 146 is sandwiched between the first electrode 142 and the second electrode 144 such that the first electrode is provided on and in contact with the first surface 150 and the second electrode 144 is provided on and in contact with the second surface 152. The first electrode 142 can be coupled to a first power source $V_1$ and the second electrode 144 can be coupled to a second power source $V_2$. The first power source $V_1$ and the second power source $V_2$ can be coupled to a voltage source 156 capable of applying varying bias voltages to the electrodes 142 and 144.

In either the two- or three-component multilayer film, a first surface and an opposite second surface (not shown) of the multilayer film so formed can be metalized with a first dielectric layer and a second dielectric layer of an appropriate metal, such as aluminum, to form the first electrode and the second electrode. The first metal layer and second metal layer can have thicknesses of about 5 nm to about 500 nm and be formed, for example, by conventional metallization techniques.

Figure 7:
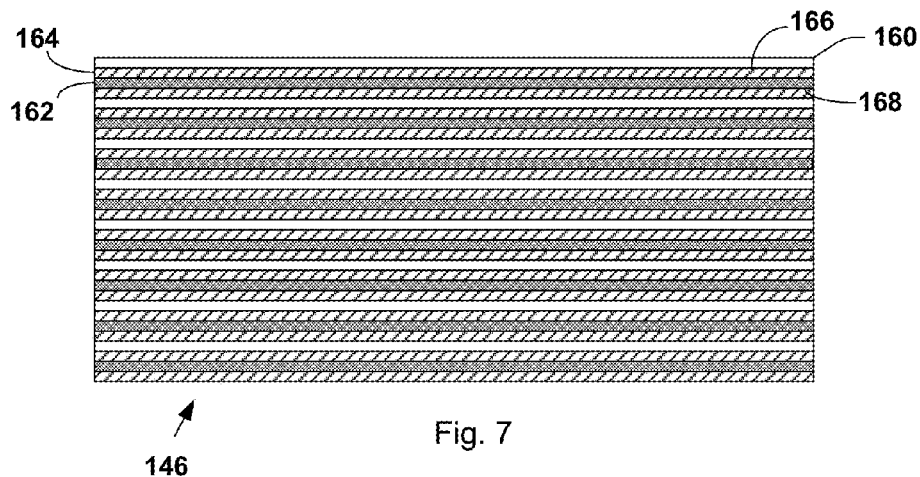
FIG. 7 is a schematic illustration of a multilayer polymer dielectric film of the capacitor of FIG. 6.

Referring to FIG. 7, in some embodiments the three-component multilayer film 146 can include a plurality of alternating first dielectric layers 160, second dielectric layers 162, and tie layers 164 of, respectively, a first polymer material, a second polymer material, and a third polymer material. The first dielectric layers 160, the second dielectric layers 162, and the tie layers 164 can be substantially parallel and stacked so that each first dielectric layer is adjacent to at least one of the tie layers to define a first interface 166 between the two layers. Similarly, each second dielectric layer 162 is adjacent to at least one of the tie layers 164 to define a second interface 168 between the two layers. Each interface 166, 168 and/or the combination of interfaces can delocalize charge build up in the layers 160 and 162 and the multilayer film 146.

One of ordinary skill in the art will readily appreciate that a wide variety of thermoplastic polymeric materials can be used to form the first dielectric layers, second dielectric layers, and tie layers of the two- and three-component multilayer films. For example, the first polymer material, the second polymer material, and the third polymer material can be selected so that the stored energy density and breakdown strength of the two- and three-component films is maximized. In some aspects, the first polymer material can comprise a thermoplastic polymer, such as glassy, crystalline or elastomeric material, that has a high permittivity (e.g., permittivity greater than the second polymer material). The first polymer material can comprise a single polymer, a composite polymer material, or a blend of polymers. In some embodiments, the stored energy density and the permittivity of the first polymer material can be substantially greater than the stored energy density and permittivity of the second polymer material.

The second polymer material can comprise a thermoplastic, such as glassy, crystalline or elastomeric material, that has high breakdown strength (e.g., breakdown strength higher than the first polymer material). The second polymer material can comprise a single polymer, a composite polymer material, or a blend of polymers. In one aspect of the invention, the breakdown strength of the second polymer material can be substantially greater than the breakdown strength of the first polymer material and to give the two- and three-component multilayer films a higher maximum stored energy density and breakdown strength than the pure component polymers. The third polymer material can comprise a thermoplastic, such as glassy, crystalline or elastomeric material. The third polymer material can comprise a single polymer, a composite polymer material, or a blend of polymers.

The term "polymer" or "polymeric material" as used in the present application denotes a material having a weight average molecular weight (Mw) of at least 5,000. Preferably, the polymer is an organic polymeric material. The term "oligomer" or "oligomeric material" as used in the present application denotes a material with a weight average molecular weight of from 1,000 to less than 5,000. Such polymeric materials can be glassy, crystalline or elastomeric polymeric materials.

Examples of polymeric materials that can be used to form the first dielectric layer, second dielectric layer, and tie layer of the multilayer films include maleic anhydride-modified polypropylene (PPgMA); polyethylene naphthalate and isomers thereof such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers such as atactic, isotactic and syndiotactic polystyrene, α-methyl-polystyrene, para-methyl-polystyrene; polycarbonates such as bisphenol-A-polycarbonate (PC); poly(meth)acrylates such as poly(isobutyl methacrylate), poly(propyl methacrylate), poly(ethyl methacrylate), poly(methyl methacrylate) (PMMA), poly(butyl acrylate) and poly(methyl acrylate) (the term "(meth)acrylate" is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly(4-methyl)pentene; fluorinated polymers, such as perfluoroalkoxy resins, polytetrafluoroethylene, fluorinated ethylene-propylene copolymers, polyvinylidene fluoride, and polychlorotrifluoroethylene and copolymers thereof; chlorinated polymers such as polydichlorostyrene, polyvinylidene chloride and polyvinylchloride; polysulfones; polyethersulfones; polyacrylonitrile; polyamides; polyvinylacetate; polyether-amides. The dielectric layers can also be formed from copolymers such as, styrene-acrylonitrile copolymer (SAN), for example, containing between 10 and 50 wt %, preferably between 20 and 40 wt %, acrylonitrile, styrene-ethylene copolymer; and poly(ethylene-1,4-cyclohexylenedimethylene terephthalate) (PETG). Additional polymeric materials include an acrylic rubber; isoprene (IR); isobutylene-isoprene (IIR); butadiene rubber (BR); butadiene-styrene-vinyl pyridine (PSBR); butyl rubber; polyethylene; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); and urethane rubber. Additional polymeric materials include block or graft copolymers. In addition, each individual layer of either the two- or three-component multilayer film can include blends of two or more of the above-described polymers or copolymers, preferably the components of the blend are substantially miscible.

In one example, the first dielectric layer(s) can be formed from a material that has a high permittivity, such as polyvinylidene fluoride (PVDF) or a copolymer thereof, such as poly(vinylidene fluoride-co-hexafluoropropylene) (P(VDF-HFP)) or composites thereof. The second dielectric layer(s) can be polypropylene (PP), polyethylene teraphthalate (PET), polycarbonate (PC), poly(p-phenylene sulfide), copolymers thereof, or composites thereof. The tie layer(s) can be formed from poly(methyl methacrylate) (PMMA), styrene-acrylonitrile copolymer containing 30 wt % acrylonitrile (SAN30), poly(ethylene-1,4-cyclohexylenedimethylene terephthalate) (PETG), copolymers thereof, or composites thereof. In some embodiments, the tie layer can be formed from a polymer that is at least partially miscible with the polymers used to form the first dielectric layer and the second dielectric layer. For example, PMMA is at least partially miscible with both P(VDF-HFP) and SAN30, which can be used to form the first dielectric layer and the second dielectric layer.

The two-component multilayer films can include, for example, about 1% to about 99% by weight of the first polymer material and about 1% to about 99% by weight of the second polymer material. The three-component multilayer films can further include, for example, about 1% to about 99% by weight of about 1% to about 99% by weight of the third polymer material. The weight ratio or weight percent of the first polymer material to the second polymer material and third polymer material in the multilayer films can be adjusted by altering the thicknesses of the first polymer layer and/or the second layer and/or the third polymer layer to tailor the dielectric and energy density properties of the film.

In one example, the two-component multilayer film can include about 50% polycarbonate (PC) and about 50% PVDF or a copolymer thereof. A two-component multilayer film comprising about 50% PC and about 50% PVDF has a maximum energy density of at least about 13 J/cm$^3$ and a dielectric strength of 750 kV/mm. In another example, the three-component multilayer film can include about 40% polycarbonate (PC), about 40% PVDF or a copolymer thereof, and about 20% PMMA. A three-component multilayer film comprising about 40% PC, about 40% PVDF, and about 20% PMMA has a maximum energy density of at least about 13 J/cm$^3$ and a dielectric strength of at least 850 kV/mm.

It will be understood, however, that a specific constituent or concentration of first polymer material, second polymer material, third polymer material or any constituent in a multilayer film according to the invention can be adjusted so as to tailor the properties of polymeric dielectrics for different applications. For an implantable defibrillator, for example, high energy density is required as well as high breakdown voltages. In that instance, it is necessary to maximize the PVDF content for the energy requirement and to balance it accordingly with PC to stabilize the poor electrical properties of PVDF. However, to obtain one or more desired properties other than simply energy density, it may be necessary to reduce the concentration of PVDF.

Optionally, any one or more of the first dielectric layer, the second dielectric layer, and the tie layer can include one of more additives to improve the stored energy density, breakdown strength, and/or permittivity of the multilayer film. For example, the first dielectric layer and/or the second dielectric layer and/or the tie layer can include metal oxide particles, such as titanium dioxide, barium titanate, and/or silica particles, to improve dielectric properties (e.g., discharge resistance, breakdown strength, and permittivity) of the host polymer.

The two-component multilayer film includes at least two layers (e.g., the first dielectric layer and the second dielectric layer), for example, at least 10 layers alternating between the first dielectric layer and the second dielectric layer. The number of layers in the two-component multilayer film is preferably in the range of from about 2 to about 100,000 and more preferably from about 10 to about 10,000, including any increments within these ranges. The two-component multilayer film can include up to about 500,000 layers alternating between the first dielectric layer and the second dielectric layer.

Similarly, the three-component multilayer film includes at least three layers (e.g., the first dielectric layer, the second dielectric layer, and the tie layer), for example, at least 65 layers alternating between the first dielectric layer, the second dielectric layer, and the tie layer. The number of layers in the three-component multilayer film is preferably in the range of from about 3 to about 100,000 and more preferably from at least about 5, 9, 13, 17, 21, or more layers. In some embodiments, the number of layers in the three-component multilayer film is from about 33 to about 10,000 layer (e.g., about 65 layers), including any increments within these ranges. The three-component multilayer film can include up to about 500,000 layers alternating between the first dielectric layer, the second dielectric layer, and the tie layer.

The layers of the multilayer films can have thicknesses in the range of, for example, about 5 nanometers (nm) to about 1,000 micrometers (μm). The thicknesses of the first dielectric layer(s), the second dielectric layer(s), and the tie layer(s) are such that the final two- and three-component multilayer films can have a hierarchical structure on the nanometer, the micrometer, and the centimeter scale. The number of first dielectric layers, second dielectric layers, and tie layers employed in the multilayer films as well as the thicknesses of each of the layers can be selected so that the energy density, breakdown strength, hysteresis loop area, and ion migration of the film is maximized.

The two-component multilayer dielectric film can also include other, different polymer layers besides the first layer(s) and the second layer(s). Although the multilayer films are given two- and three-component designations, it will be appreciated that such designations simply refer to the minimum number of different components in the composite structure. That being said, these other, different polymer layers can be interspersed with the first layers and the second layers to modify the stored energy density, breakdown strength, and permittivity of the multilayer film. In one example, the first layer (A), the second layer (B), and the additional (i.e., third) layer can be alternated so that the multilayer film has a three-component structure of alternating layers (ABCABCABC . . . ) or $(ABC)_x$, where x is at least 5. It will be appreciated that the first layer, second layer, and third layer can be provided in any order of different component layers such as (CACBCACBC . . . ).

In some embodiments, the two-component multilayer film can be prepared by coextruding the first polymer material and the second polymer material and layering the first layers and the second layers in a hierarchical structure as described above and disclosed in U.S. Pat. No. 6,582,807, issued Jun. 24, 2003, to Baer et al, which is incorporated herein by reference in its entirety. Advantageously, the first polymer material and the second polymer material can be coextruded without the use of a solvent so the coextrusion process is substantially solventless and/or solvent-free.

Similarly, as noted, the three-component multilayer film can also include other, different polymer layers besides the first dielectric layer(s), the second dielectric layer(s), and the tie layer(s). These other polymer layers can be interspersed with the first dielectric layers, the second dielectric layers, and the tie layers to modify, for example, the stored energy density, breakdown strength, and permittivity of the multilayer film. In such a construction, these additional layers form their own interphase region(s) with the tie layer(s). In one example, the first dielectric layer (A), the second dielectric layer (B), the tie layer (T), and the additional (i.e., fourth) layer can be alternated so that the multilayer film has a four-component structure of alternating layers (ATBTCTATBTCTATBTC . . . ) or $(ATBTC)_x$, where x is at least 5. It will be appreciated that the first dielectric layer, second dielectric layer, tie layer, and fourth layer can be provided in any order of different component layers such as (CTATCTBTCTATCTB . . . ).

In some embodiments, the three-component multilayer film can be prepared by coextruding the first polymer material, the second polymer material, and the third polymer material and layering the first dielectric layers, the second dielectric layers, and the tie layers in a hierarchical structure as described above with regards to the two-component multilayer film. Advantageously, the first polymer material, the second polymer material, and the third polymer material can be coextruded without the use of a solvent so that coextrusion process is substantially solventless and/or solvent-free.

Advantageously, the multilayering technique described herein allows the use of miscible, immiscible or partially miscible polymers to achieve a large stored energy density and breakdown strength in the films. This allows the fabrication of films that have higher stored energy density and breakdown strength than commercial capacitor films, such as PP and PET capacitor films.

In other embodiments, the dielectric properties of the multilayer films can be varied mechanically by axially orienting (e.g., stretching), and/or applying pressure, tension, compression or shear stresses or a combination of these stresses to the multilayer films before, during, and/or after coextrusion. As noted, the composite can be fabricated so that one or more of the component polymers is an elastomer. It was found that axial orientation of the two- and three-component multilayer polymer dielectric films in at least one direction parallel to the surface of the film unexpectedly improved the breakdown strength of the film. In one example, the multilayer film can be biaxially oriented by stretching the film in a plane that is substantially parallel to a surface of the film at a draw ratio effective to increase the breakdown strength of the film. The draw ratio of the biaxially oriented multilayer film can be about 1:1 to about 5:5. It will be appreciated that although the multilayer film can be biaxially oriented by stretching the film in at least two directions, the multilayer film can also be stretched in a single direction (e.g., uniaxially oriented) or stretched in multiple directions (e.g., triaxially oriented).

A number of designs of the two-component multilayer dielectric film material are possible simply by choosing the appropriate initial materials and tailoring the polymer materials, number of layers of the polymer materials, and thicknesses of the layers. A representative example of two polymers that could be used to form the first dielectric layer and the second dielectric layer, respectively, are PVDF and PC. The specific percentages of the polymers and therefore the thicknesses and number of layers will depend on the specific requirements of the film applications (e.g., capacitor) in each particular instance. The use of PVDF and PC in alternating first and second layers results in improvements in the electrical properties of the multilayer film, including an increase in the breakdown voltage and electrical conductivity of the multilayer film compared to PVDF alone and/or PC alone. The result is a two-component multilayer film with enhanced energy density, breakdown strength, and electrical stability over PVDF or PC homopolymer alone.

Similarly, a number of designs of the three-component multilayer film material are possible with this invention simply by choosing the appropriate initial materials and tailoring the polymer materials, number of layers of the polymer materials, and thicknesses of the layers. A representative example of three polymers that could be used to form the first dielectric layer, the second dielectric layer, and the tie layer, respectively, are PVDF, PMMA, and PC. The specific percentages of the polymers and therefore the thicknesses and number of layers will depend on the specific requirements of the film application (e.g., capacitor) in each particular instance. The use of PVDF, PMMA, and PC in alternating first, second, and tie layers results in improvements in the electrical properties of the multilayer film, including an increase in the breakdown voltage, energy density, and electrical conductivity of the multilayer film compared to PVDF alone and/or PC alone and/or PMMA alone. The result is a three-component multilayer film with enhanced energy density, breakdown strength, and electrical stability over PVDF, PMMA or PC homopolymer alone.

The enhanced breakdown properties of the three-component multilayer film are attributable to a distinct tree fracturing mechanism, observed under a divergent electric field. This fracture mechanism is facilitated by the aforementioned layer interfaces between the tie layers and the first and second dielectric layers, respectively, in the three-component multilayer film. These layer interfaces act as "barriers" to impede electrical propagation through the thickness of the multilayer film. As a result, the multilayer film discharges electrical energy along the layer interfaces, forming tree-like damage zones on the multilayer film surface. Since the layer interfaces play a large role in dictating the breakdown properties, using the techniques of the present invention to adjust the layer materials, layer thicknesses, number of layers, etc. as discussed manipulates the interfaces and thereby allows for the specific tailoring of the breakdown properties of the multilayer film. Moreover, it is believed that altering other interface variables, such as adhesion, interface roughness, and layer interdiffusion on the resulting multilayer film can be readily achieved with forced assembly coextrusion.

Such design principles are readily extended to other polymeric materials for either the two- or three-component multilayer films, such as polyester or polypropylene or any other dielectrics to tailor the dielectric properties desired for a particular application. Very thin metalized film capacitors designed in accordance with this multilayer technique enable achieving a device with stable dielectric constant and, hence, stable capacitance with voltage, improved insulation resistance and clearing or self-healing ability, lower leakage currents, and higher voltage breakdowns (compared with, for example, homopolymer PVDF), with the potential for unprecedented energy density from a bulk capacitor system. The markedly higher performance values (energy density, reliability, weight) can be matched by markedly lower cost per unit of performance when volume manufacturing is employed. The methodology described herein is well suited for the production of the implantable defibrillator, for example, and in many other high pulse power applications where energy density is afforded a premium.

The multilayer films described herein offer high dielectric constant, improved stability, improved dissipation factor, improved clearing ability, and high breakdown voltage. Although these two- and three-component films are particularly well suited for film capacitor applications, it is also useful in electrical cables, magnetic tapes, optical films for security and other purposes, piezoelectric sensors, and food packaging, to name a few other applications.

This invention is further illustrated by the following examples, which should not be construed as limiting. The contents of all references, patent applications, patents, and published patent applications cited throughout this application are hereby incorporated by reference.

EXAMPLES

Example 1

Multilayer polymer dielectric films comprising either 32 or 256 layer were prepared by coextruding nanolayered sheets of alternating polycarbonate (PC) (MAKROLON 2205, which is commercially available from Bayer Material Science) and poly(vinylidene fluoride-co-hexafluoropropylene) (P(VDF-HFP)) which is commercially available from Solvay Solexis as SOLEF 21508)). The films produced included 0/100, 10/90, 30/70, 50/50, 70/30, 90/10, or 100/0 of the PC and the P(VDF-HFP) respectively. The layer thickness of the 50/50 composition was 400 nm for the 32 layer film and 50 nm for the 256 layer film.

Figure 8:
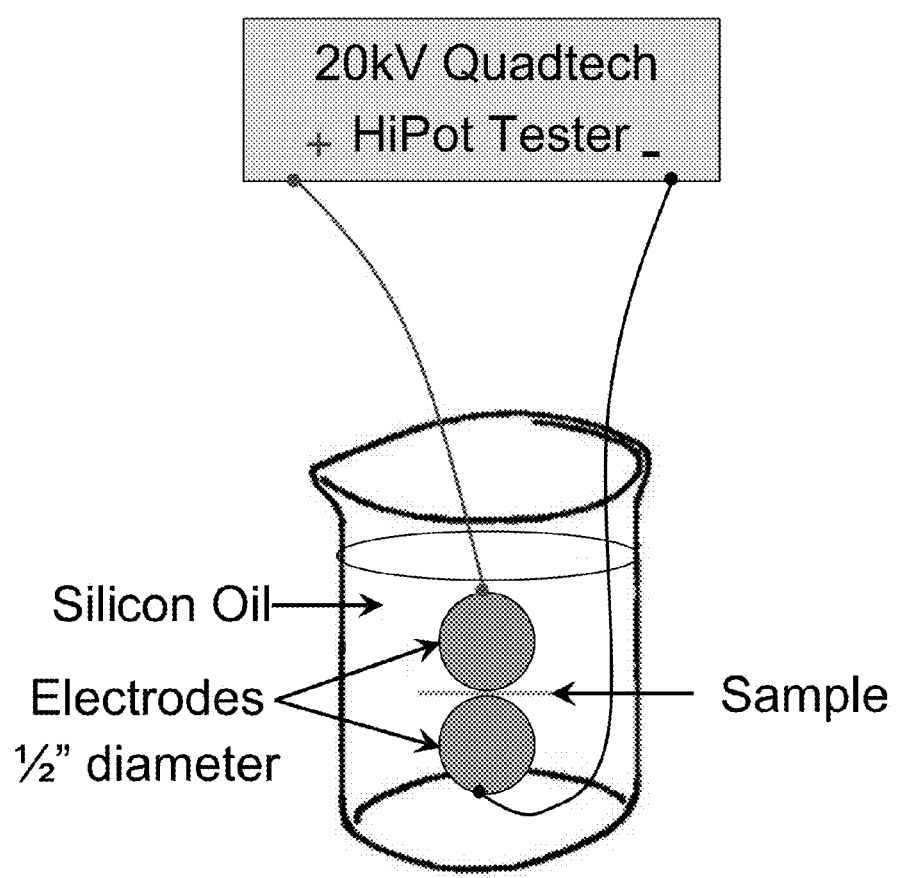
FIG. 8 is a schematic illustration of a device for measuring the breakdown strength of the multilayer polymer dielectric film.
Figure 9:
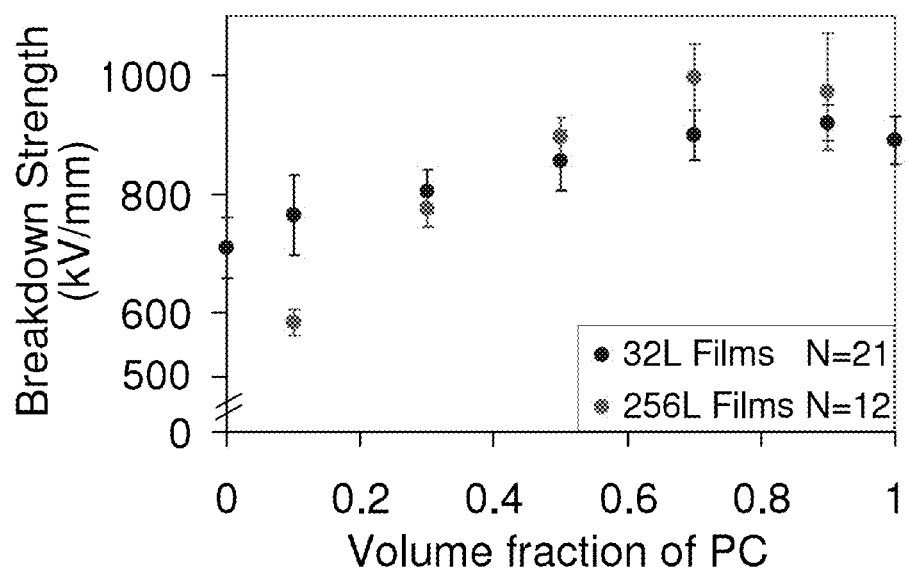
FIG. 9 illustrates plots of the measured breakdown strengths for different multilayer polymer dielectric film compositions.

The breakdown strength of each film was measured using a 20 kV Quadtech (Marlborough, Mass.) HiPot tester with a 500V/S ramp as shown in FIG. 8. The breakdown strength in kV/mm for the various compositions of the 32 layer film and the 256 layer film was plotted as shown in FIG. 9, which shows that the 32 layer films and the 256 layer films each has an increased breakdown strength relative to pure single polymer controls. The highest breakdown strengths were observed in 70 PC/30 P(VDF-HFP) films.

Figure 10:
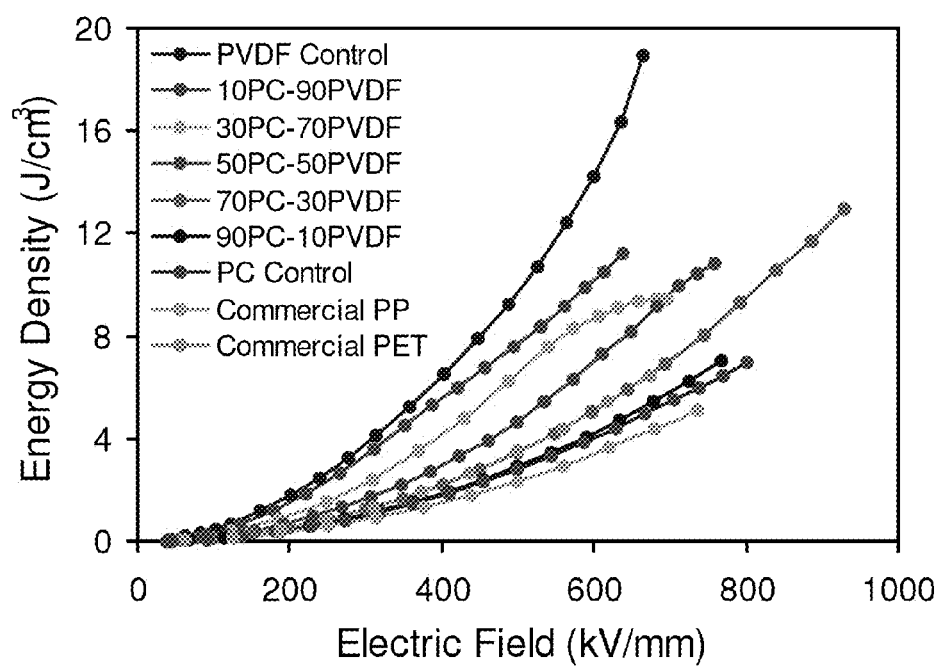
FIG. 10 illustrates plots of energy density vs. applied field for different multilayer polymer dielectric film compositions and includes data on current commercially available PP and PET films.

FIG. 10 plots the maximum energy density versus composition for various compositions of 256 layer films. The $U_d$ of the 50 PC/50 PVDF film is 13 J/cm$^3$, which is more than twice the energy density of PP and PET commercial capacitor films. The 50 PC/50 PVDF film also has a low tan δ (0.015) and low hysteresis. Consequently, and as can be seen from the foregoing figures, the 50 PC/50 PVDF film has the excellent properties for a high quality energy density capacitor.

Example 2

Multilayer polymer dielectric films comprising 32 layers were prepared by coextruding nanolayered sheets of polyethylene terephthalate (PET) and poly(vinylidene fluoride-co-tetrafluoroethylene) (P(VDF-TFE)). The films produced included 50/50, 70/30, 90/10, or 100/0 of the PET and the P(VDF-TFE) respectively. The layer thickness of the 50/50 composition was 400 nm for the 32 layer. The films comprising the various polymer ratios were biaxially stretched in a Bruckner Karo biaxial stretcher. The films were simultaneously and equi-biaxially drawn to draw ratios varying from 3:3 to 5:5.

Figure 11:
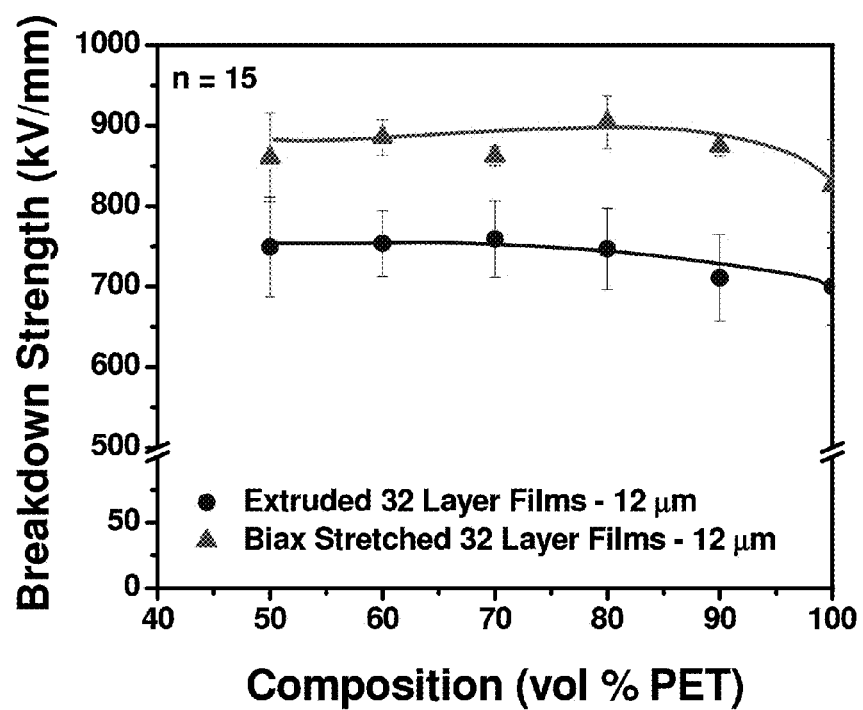
FIG. 11 illustrates plots of the measured breakdown strengths for stretched and unstretched multilayer polymer dielectric film compositions.

The breakdown strength of biaxially oriented films was measured using a 20 kV quadtech HiPot tester with a 500V/S ramp (see FIG. 8) and compared with unstretched films having a similar composition. The breakdown strength in kV/mm for the various compositions of the 32 layer stretched and unstretched films were plotted as shown in FIG. 11, which shows that the 32 layer biaxially oriented films each have an increased breakdown strength relative to unstretched control films. The highest breakdown strengths were observed in the biaxially oriented 80 PET/20 P(VDF-TFE) films.

Example 3

Materials

Polycarbonate (PC) was obtained from Bayer Material Science (Makrolon 2207). Polyvinylidene fluoride-co-hexafluoropropylene (P(VDF-HFP)) was provided by Arkema Inc. (Kynar 2500). Poly(methyl methacrylate) (PMMA) was obtained from Arkema Inc. (Plexiglas V826). Styrene-co-acrylonitrile copolymer with 30% acrylonitrile content (SAN30) was supplied by the Dow Chemical Company (Tyril 880). Poly(ethylene terephthalate-co-1,4-cyclohexanedimethylene terephthalate) (PETG) was obtained from Eastman Chemical Co. (Eastar 6763). PC, PMMA, SAN30, and PETG were all dried under vacuum at 80° C. for 12 hours prior to melt processing.

Three-component multilayer films with an ATBTATBTA layered structure were produced using a forced assembly multilayer coextrusion process. The coextrusion temperature for all three systems was 250° C. This temperature was chosen based on the viscosity matching of each polymer, as determined by melt flow index (MFI) at a shear rate that is similar to the extrusion condition ($10 \text{ s}^{-1}$). Referring to Table 1, the various tie layer systems all contained a total of 65-layers. Samples were produced at various tie layer thicknesses (from 6 nm up to 103 nm) by adjusting the relative pump rate of the tie layer extruder. All of the samples had an equal volume amount of PC and P(VDF-HFP). For comparison, a 50/50 33-layer PC/P(VDF-HFP) sample without the tie layer was also produced with an ABABA layered structure. All samples were laminated with two sacrificial LDPE skin layers during coextrusion to protect the film from damage, improve the surface quality, and reduce defects. All skin layers were removed prior to any subsequent testing.

TABLE 1

PC/tie/P(VDF-HFP) multilayer films under investigation

| Multilayer Film Compositions PC/tie/P(VDF-HFP) (vol. %) | Number of Layers | Tie Layer Thickness (nm) | PC or P(VDF-HFP) Layer Thickness (nm) |
|---|---|---|---|
| 50/0/50 | 33 | — | 312 |
| 49/2/49 | 65 | 6 | 306 |
| 48/4/48 | 65 | 13 | 300 |
| 46/8/46 | 65 | 25 | 288 |
| 40/20/40 | 65 | 63 | 250 |
| 33/33/33 | 65 | 103 | 206 |

Dielectric Breakdown Strength Measurements

The breakdown field of the multilayered samples was determined using a ramped voltage of 500 V/s using needle/plane electrodes. The positive needle electrodes had a tip radius of 20 µm and the negative plane consisted of a flat rectangular piece of aluminum. The quadtech Guardian 20 kV HiPot tester (FIG. 8) was used as the voltage source. All breakdown experiments were carried out in mineral oil to reduce surface and corona discharging. Twenty repetitions were done on each sample and the needle electrodes were replaced every 10 measurements.

Atomic Force Microscope (AFM)

The multilayer sample cross sections were imaged using an AFM. The samples were first embedded in epoxy, cured overnight, and sectioned at −100° C. using a Leica Microsystems (Buffalo Grove, Ill.) EM FC6 ultramicroscope. Polished samples were then imaged using an AFM operating in the tapping mode. The phase and height images were recorded simultaneously using a Nanoscope IIIa Multimode scanning probe (Digital Instruments, Santa Barbara, Calif.).

Broadband Dielectric Spectroscopy

Low-field dielectric spectroscopy was carried out under vacuum at 20° C. and 100° C., respectively, using a Novocontrol (Hundsange, Germany) spectrometer with a frequency sweep from 0.01 Hz to 100 kHz. The sample electrodes were prepared by sputtering two 1 cm diameter circular gold electrodes onto each film surface using an Electron Microscopy Sciences sputter coater (EMS Q300T, Quantum Technologies Ltd, Ashford, Kent, England).

Dielectric Hysteresis Measurements

Electric displacement—electric field (D-E) hysteresis measurements were carried out using a Premiere II ferroelectric tester from Radiant Technologies Inc. (Albuquerque, N. Mex.). All samples were measured using a triangular waveform, with a frequency of 1 Hz. The applied voltage was increased in increments of 50 kV/mm until the samples broke down. An electrostatic sandwich setup was used to conduct the hysteresis measurements. A thick, 100 µm polyimide mask with a 1 cm diameter circular hole was used to determine the area under applied electric field. The electrodes consisted of two $1.2 \times 6 \text{ cm}^2$ strips of 6 µm thick, aluminum-metalized BOPP film. The charge energy density, $U_c$, discharge energy density, $U_d$, and loss energy density, $U_l$, were calculated from the hysteresis curves according to:

$$U_c = \int_0^{D(T)} E(t) dD(t) \quad (1)$$

$$U_d = \int_D^{D(2T)} E(t) dD(t) \quad (2)$$

$$U_l = U_c - U_d \quad (3)$$

where T is the time is takes for the voltage waveform to reach maximum from zero, E(t) is the applied electric field and D(t) is the corresponding electric displacement.

Results and Discussion

Figure 12:
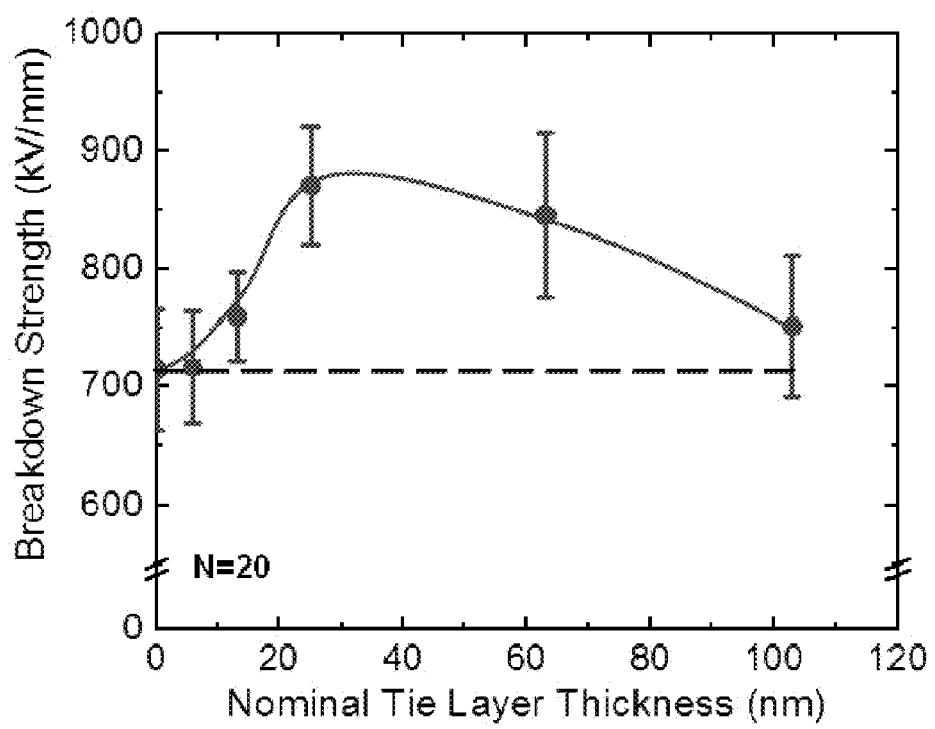
FIG. 12 illustrates Dielectric breakdown strength as a function of nominal tie layer thickness for 65-layer PC/PMMA/P(VDF-HFP) films. The 33-layer PC/P(VDF-HFP) film was also included and taken as the film with 0 nm tie layer thickness (indicated as the dashed line).

Dielectric Properties of PC/PMMA/P(VDF-HFP) Multilayer Films with Various PMMA Thicknesses FIG. 12 plots the dielectric breakdown strength for PC/PMMA/P(VDF-HFP) system as a function of PMMA layer thickness. The breakdown strength of 33-layer PC/P(VDF-HFP) film was also included and taken as the film with 0 nm tie layer thickness and indicated as the dashed line in FIG. 12. By comparing the dashed line with the solid line, it is evident that the incorporation of a PMMA tie layer in between PC and P(VDF-HFP) had a substantial impact on the dielectric breakdown properties. Initially, the breakdown strength of PC/PMMA/P(VDF-HFP) increased with increasing PMMA layer thickness. The maximum breakdown strength of 880 kV/mm appeared at 25 nm nominal PMMA layer thickness and represented a 25% improvement in dielectric breakdown strength relative to the 33-layer PC/P(VDF-HFP). For samples with PMMA tie layer thickness greater than 25 nm, the dielectric breakdown strength began to level off and then slowly decrease.

The hysteresis properties were also determined for the 65-layer PC/PMMA/P(VDF-HFP) system in addition to the 33-layer 50/50 PC/P(VDF-HFP) control. All films had equal amounts of PC and P(VDF-HFP) and the film thicknesses were maintained at 10 µm. Representative unipolar D-E polarization hysteresis curves are shown in FIGS. 13(a)-(f). By comparing the plot (a) for the 33-layer 50/50 PC/P(VDF-HFP) and the plots (b)-(f) for 65-layer PC/PMMA/P(VDF-HFP) with various PMMA tie layer thicknesses, it is evident that the 33-layer 50/50 PC/P(VDF-HFP) had the largest loop compared with PC/PMMA/P(VDF-HFP) system at the same electric field. The addition of a PMMA tie layer (even as little as 6 nm, 2 v %) reduced the hysteresis D-E loop area dramatically at the same electric field.

Figure 14A:
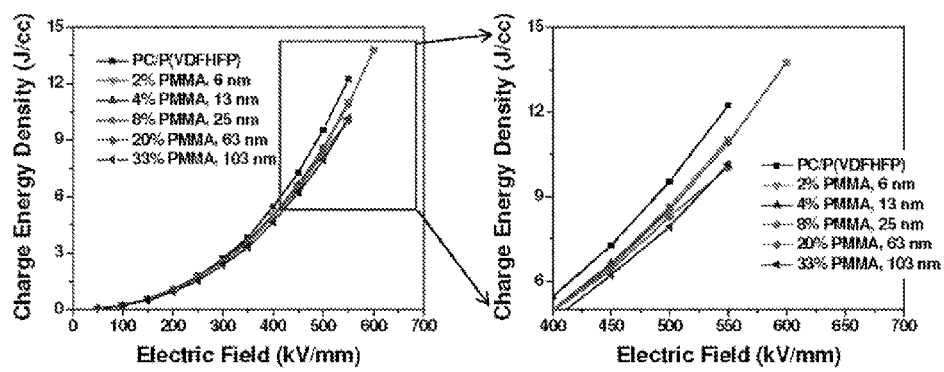
FIG. 14 illustrates a) charge energy density, b) discharge energy density, and c) loss energy density as a function of electric field for 65-layer PC/PMMA/P(VDF-HFP) films with various layer thicknesses/compositions, with a 50/50 PC/P(VDF-HFP) 33-layer film included for comparison.
Figure 14B:
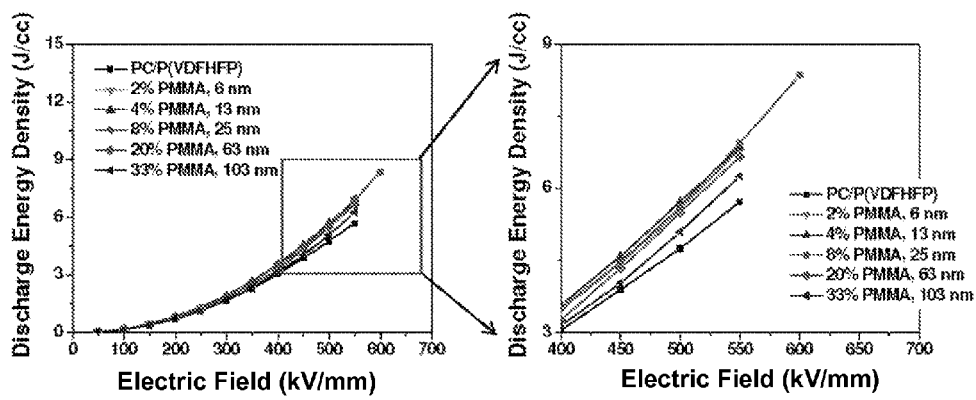
Figure 14C:
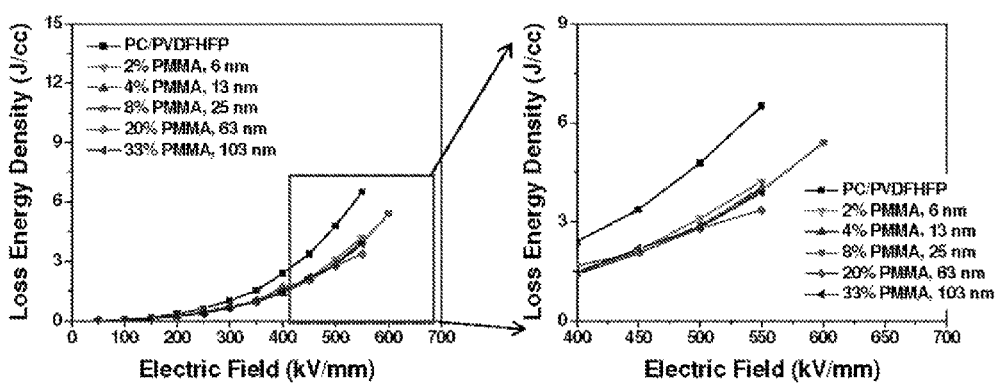

To quantify the hysteresis properties, the charge energy density, discharge energy density, and loss energy density were calculated as a function of electric field for all the 65-layer PC/PMMA/P(VDF-HFP) compositions in addition to the 33-layer PC/P(VDF-HFP) control and plotted in FIGS. 14(a)-(c). The 33-layer PC/P(VDF-HFP) film sample exhibited maximum charge energy density. However, these samples also contained the lowest discharge energy density due to the large hysteresis loop areas. The 65-layer PC/PMMA/P(VDF-HFP) samples exhibit much larger discharge energy densities due to the reduced loop areas. In addition, the 65-layer 46/8/46 PC/PMMA/P(VDF-HFP) sample with 25 nm nominal tie layer thickness, possessed the highest breakdown properties, which correlated well with the breakdown data shown in FIG. 12.

Figure 15:
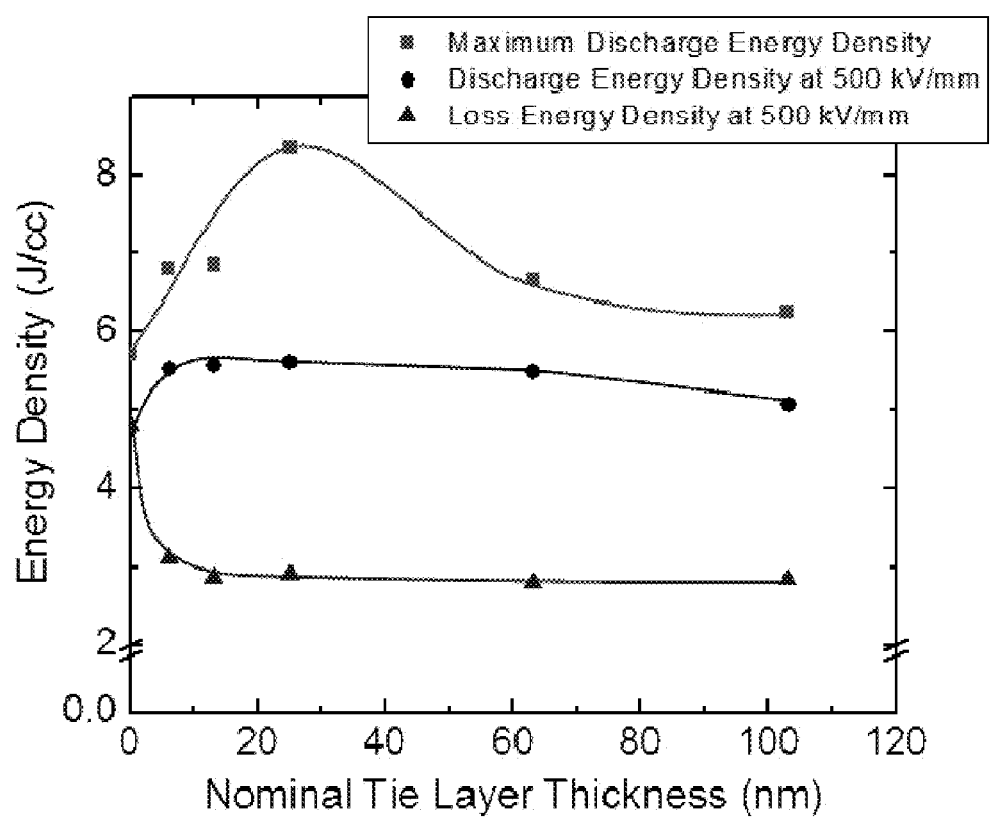
FIG. 15 illustrates the maximum discharge energy density and hysteresis property values at 500 kV/mm as a function of PMMA tie layer thickness for the 65-layer PC/PMMA/P(VDF-HFP) multilayer films.

To better illustrate the data in FIGS. 14(a)-(c), the values for maximum discharge energy density and the hysteresis properties at a given field, in this case 500 kV/mm, were plotted as a function of nominal PMMA tie layer thickness in FIG. 15. The maximum discharge energy densities for the 33-layer 50/50 PC/P(VDF-HFP) film and the 65-layer 46/8/46 PC/PMMA/P(VDF-HFP) film were 5.72 J/cc and 8.36 J/cc, respectively. In other words, the 65-layer 46/8/46 PC/PMMA/P(VDF-HFP) sample can store nearly 50% more energy than the 33-layer 50/50 PC/P(VDF-HFP) sample at a given area, which is desirable for capacitor and other electrical storage applications.

At 500 kV/mm, the discharge energy density for the 33-layer 50/50 PC/P(VDFHFP) film was 4.75 J/cc, while the 65-layer 49/2/49 PC/PMMA/P(VDF-HFP) had a discharge energy density of 5.54 J/cc. The discharge energy density increased slightly with increasing PMMA layer thickness, and then dropped gradually when the PMMA thickness was above 25 nm. It is speculated that there are at least two contradictory reasons that dictate the trend in discharge energy density for the 65-layer PC/PMMA/P(VDF-HFP) system with various PMMA tie layer thicknesses. One reason is that a small fraction amount of PMMA can increase the capacitance for storing more electric energy. It was speculated that the slight increase in dielectric constant was due to either increased content of β-crystal in the P(VDF-HFP) layer or loosening up of the dipole in the amorphous part of P(VDF-HFP) facilitated by PMMA chains. The other reason is that incorporating large fractions of PMMA would decrease the total film dielectric constant of 65-layer PC/PMMA/P(VDF-HFP) based on series model. The dielectric constant of PMMA, 3.71, is lower than the dielectric constant of the 33-layer 50/50 PC/P(VDF-HFP) control, 4.46. Therefore, combing PMMA with 50/50 PC/P(VDF-HFP) should decrease the dielectric constant of PC/PMMA/P(VDF-HFP).

At 500 kV/mm, the loop area for the 33-layer 50/50 PC/P(VDF-HFP) film was 4.79 J/cc, while the 65-layer PC/PMMA/P(VDF-HFP) samples had the loss energy density as low as 2.80 J/cc. This represents an approximate 40% reduction in the hysteresis behavior as compared to the 33-layer samples with no tie layer. The cause of the reduction in loss energy density in these systems was not immediately clear; however, it was speculated that the interface/interphase modification in the PC/PMMA/P(VDFHFP) system had a significant impact on the hysteresis properties. To help clarify this point, low-field dielectric spectroscopy was used to probe the ion migration characteristics in these materials.

Figure 16:
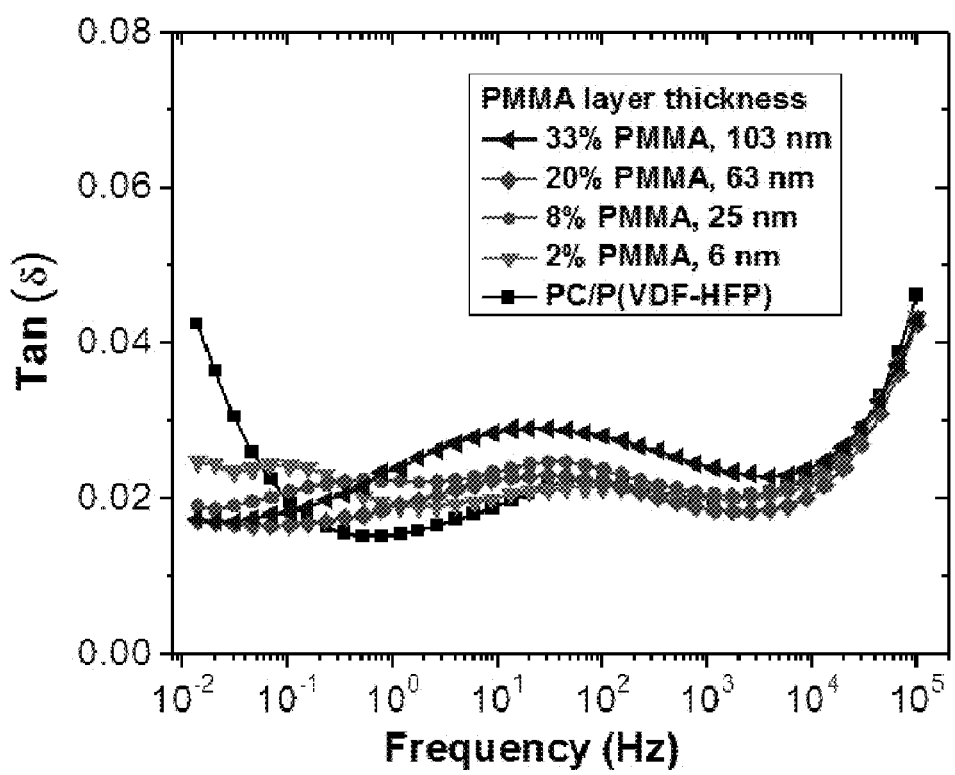
FIG. 16 illustrates dielectric loss tangent of 65-layer PC/PMMA/P(VDF-HFP) films in addition to the 33-layer PC/P(VDF-HFP) as a function of frequency at 20° C.

Ion migration in PC/PVDF (and PVDF copolymers) multilayer systems significantly contributes to the resulting hysteresis behavior of the overall films. It was found that by reducing the PVDF layer thickness, this ion motion was inhibited and was effectively probed using low-field dielectric spectroscopy at a wide range of measuring frequencies and temperatures. Following this approach, dielectric spectroscopy was measured at 20° C. and 100° C. for the various samples. At 20° C., one broad peak around 50 Hz was observed and attributed to both $\alpha_c$ of P(VDF-HFP) and β relaxation of PMMA. Referring to FIG. 16, a rise in tan(δ) was observed at very low frequencies (0.1 Hz or below) for the 33-layer 50/50 PC/P(VDF-HFP) samples. For the 65-layer PC/PMMA/P(VDF-HFP) samples at 20° C., however, no such behavior was observed. All films had equal amounts of PC and P(VDF-HFP) and film thicknesses were maintained at 10 μm.

Figure 17:
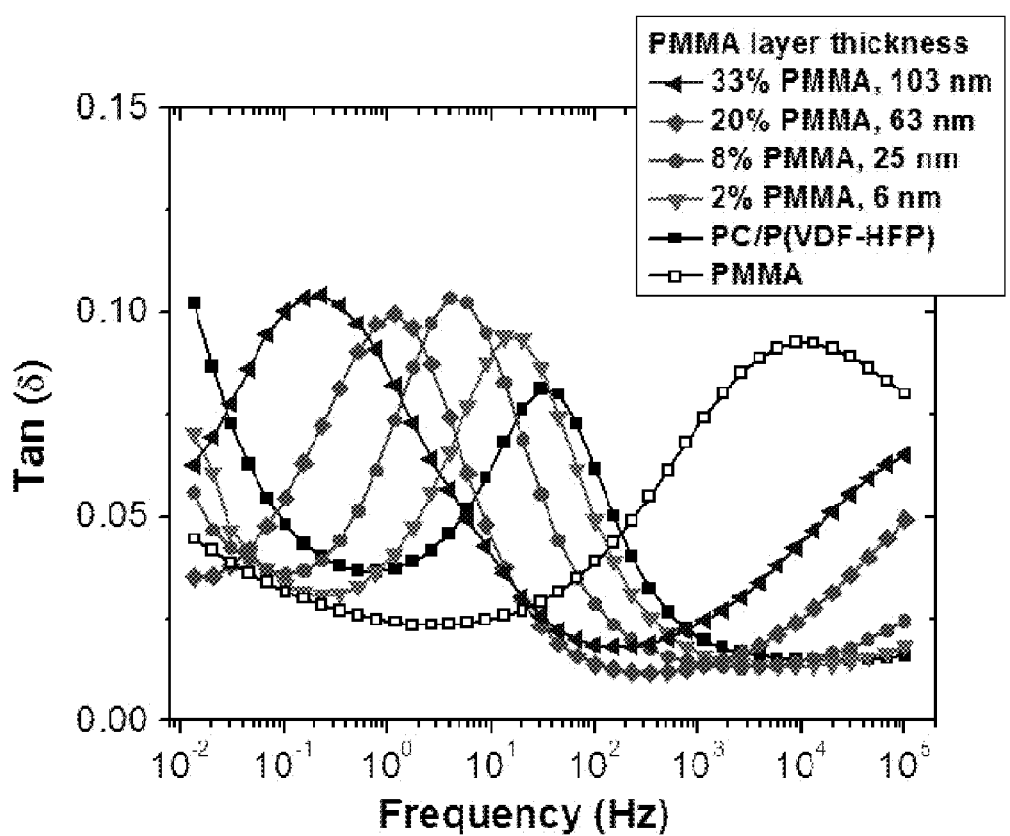
FIG. 17 illustrates dielectric loss tangent of 65-layer PC/PMMA/P(VDF-HFP) films in addition to 33-layer PC/P(VDF-HFP) and PMMA controls as a function of frequency at 100° C.

To better probe the ion migration behavior in the 65-layer PC/PMMA/P(VDFHFP) system, elevated temperatures as high as 100° C. were used to drive the ion migration peak to higher frequency, the results of which are plotted in FIG. 17. All films had equal amounts of PC and P(VDF-HFP) and film thicknesses were maintained at 10 μm. The peak of $\alpha_c$ was not observed because the peak frequency had drifted above 105 Hz. PMMA and the 33-layer 50/50 PC/P(VDF-HFP) sample were included for comparison. β relaxation peak of PMMA, associated with localized motion of methoxy groups, was observed at 10,000 Hz. The 33-layer 50/50 PC/P(VDF-HFP) film exhibited an ion migration peak centered around 30 Hz, which was assigned to the ion migration in the P(VDF-HFP) layers. Incorporation of the PMMA tie material into the system shifted the ion migration peak to lower frequencies. The peak frequency of the ion peak decreased with increasing PMMA layer thicknesses. The reduction in the ion migration peak frequency indicated that the ion migration was suppressed in the 65-layer PC/PMMA/P(VDF-HFP) system, which correlated to the reduction in the hysteresis loop area shown in FIG. 14(c). One possibility is that the localized mixing of PMMA and P(VDF-HFP) along the layered interphase created ion trap sites that can tie up these ionic species and significantly decrease the ionic species mobility under electric field. The other possibility is that the PMMA chains intermix with amorphous part of P(VDF-HFP), rigidify the amorphous P(VDF-HFP) chains, make ion movement in the interphase region impossible, and reduce the ion migration distance and mobility.

Through breakdown strength, D-E hysteresis and low field dielectric spectroscopy measurements, it was concluded that the 65-layer PC/PMMA/P(VDF-HFP) system exhibited enhanced dielectric breakdown strength, decreased hysteresis loss energy density, and slower ion migration peaks. It was evident that the improved dielectric properties were attributed to the introduction of the PMMA tie layers. Therefore, the interaction between PMMA and both PC and P(VDF-HFP) was an important structural parameter that might directly influence the resulting dielectric properties. To better visualize these material, AFM was used to quantify the PMMA tie layer thickness and attempt to observe the layer interphase in the 65-layer PC/PMMA/P(VDF-HFP) system with selected PMMA nominal layer thicknesses.

Figure 18:
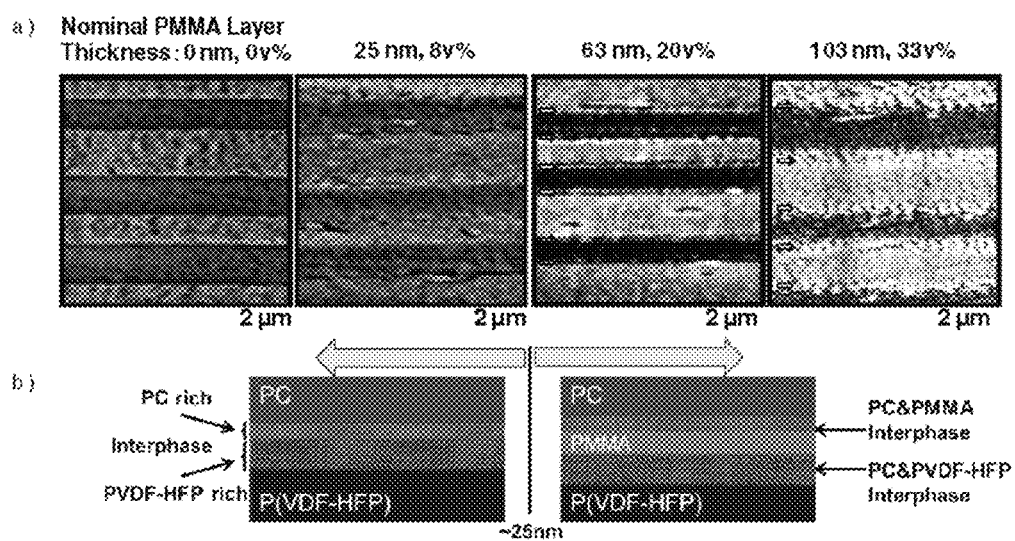
FIG. 18 illustrates a) AFM images of selected PC/PMMA/P(VDF-HFP) 65-layer samples, and b) a schematic of the layered structure in the PC/PMMA/P(VDF-HFP) 65-layer samples as a function of tie layer thickness, with a PC/P(VDF-HFP) control included for comparison.

Representative AFM images for the 65-layer PC/PMMA/P(VDF-HFP) samples with 25, 63, and 103 nm PMMA tie layers, in addition to the 33-layer 50/50 PC/P(VDF-HFP), are shown in FIG. 18(a). Sharp layer interface boundaries were observed in samples with no PMMA tie layers in between PC and P(VDF-HFP). In the sample with 25 nm PMMA tie layers, no distinct PMMA layers was observed and PMMA was completely interdiffused with both PC (lighter layers) and P(VDF-HFP) (darker layers) layers. In addition, a diffuse interface boundary was observed between PC and P(VDF-HFP) layers. In samples with 63 and 103 nm PMMA tie layers, a distinct portion of the PMMA remained with rich, interdiffused regions surrounding it. The measured distinct PMMA tie layer thicknesses were much lower than the nominal tie layer thickness.

Based on the AFM images, a schematic of the layer structure in the 65-layer PC/PMMA/P(VDF-HFP) samples was proposed, as shown in FIG. 18(b). In these 65-layer PC/PMMA/P(VDF-HFP) samples, the material between the PC and P(VDF-HFP) layers would consist of a new two-dimensional (2D) interphase material or localized 2D blend of PC/PMMA and P(VDF-HFP)/PMMA. Since the PMMA is miscible with PVDF-based polymers and only partially miscible with PC, the interphase portion of P(VDF-HFP)/PMMA was expected to be much larger than the PC/PMMA interphase region. No discrete tie layer was observed in the 46/8/46 PC/PMMA/P(VDF-HFP) 65-layer samples, with a nominal PMMA tie layer thickness of 25 nm.

Assuming both PMMA/PC and PMMA/P(VDF-HFP) interphases were symmetrical, the total interphase thickness of PMMA/PC and PMMA/P(VDF-HFP) interphase regions was twice the nominal PMMA tie layer thickness, 50 nm, after complete interdiffusion. The interphase thickness for PC and PMMA in these multilayered samples based on their interaction parameters and coextrusion conditions was estimated to be around 10 nm. Therefore, the remaining 40 nm of material consisted of an interphase region or blend of P(VDF-HFP) and PMMA. In thicker tie layers, these interphase regions are expected to be similar, and the interphase thickness for miscible PMMA/P(VDF-HFP) system could be around 40 nm. This is verified in the AFM images (FIG. 18(a)) where discrete PMMA layers are observed in the samples with a nominal PMMA tie layer thickness of 63, and 103 nm. An accurate measurement of the actual PMMA tie layer thickness in this sample is difficult due to the diffuse nature of the interphase regions; however, the discrete PMMA tie layers are thinner than the PMMA nominal thickness.

Figure 19:
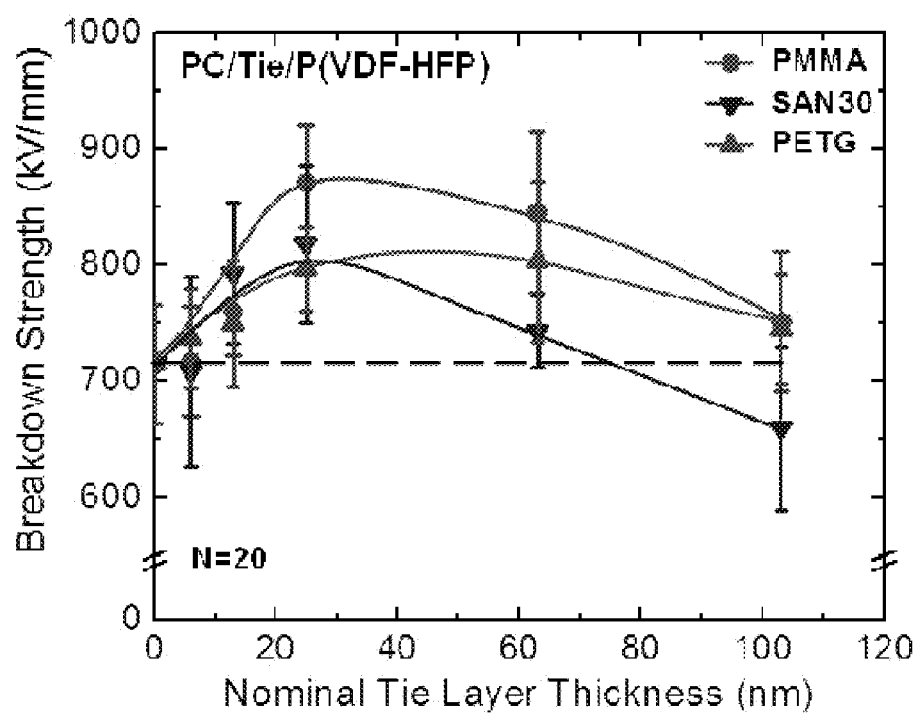
FIG. 19 illustrates a breakdown field as a function of nominal tie layer thickness for the various PC/tie/P(VDF-HFP) 65-layer films.

Dielectric Properties of 65-Layer PC/Tie/P(VDF-HFP) Multilayer Films with Various Tie Materials The breakdown field was evaluated for the various PC/tie/P(VDF-HFP) multilayer samples as a function of tie layer thickness and plotted in FIG. 19. The breakdown properties of the PC/P(VDF-HFP) 33-layer samples were also evaluated and plotted at 0 nm tie layer thickness. The average value for this sample was plotted as a dashed line for comparison. All films had equal amounts of PC and P(VDF-HFP) and film thicknesses were maintained at 10 µm. Three different tie materials, PMMA, SAN30, and PETG, were chosen due to their various degrees of interaction with either PC or P(VDF-HFP). From these data, it is evident that the incorporation of a tie layer in between the PC and P(VDF-HFP) layers had an impact on the resulting dielectric breakdown properties. The nature of the interaction between the tie layer material and both PC and P(VDF-HFP) dictated this effect. For the remaining samples, the films with PETG, and SAN30 tie layers, did exhibit a marginal improvement in the breakdown properties, again with maximums occurring at 25 nm tie layer thickness.

Figure 20:
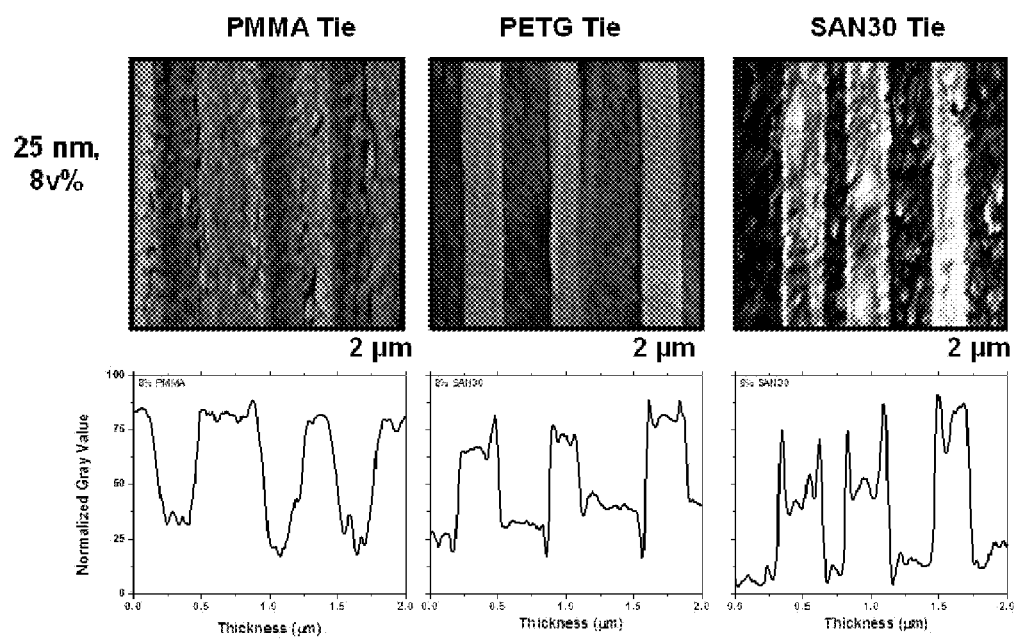
FIG. 20 illustrates AFM images (upper) and their gray value profiles (lower) of select PC/tie/P(VDF-HFP) 65-layer samples with 25 nm tie layer thickness.
Figure 21:
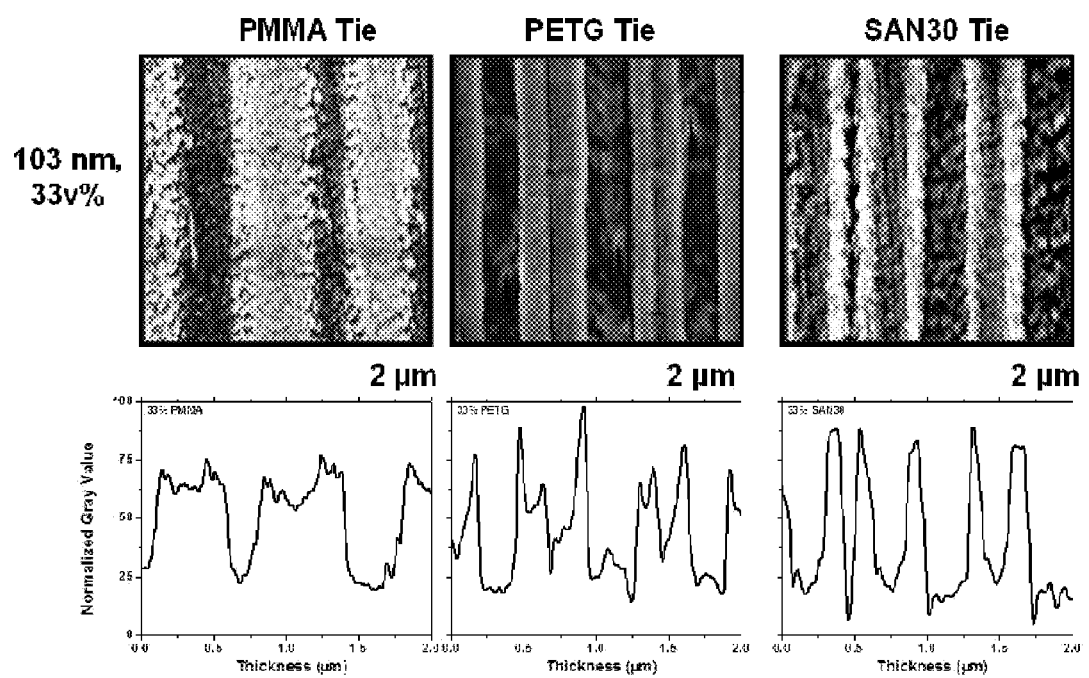
FIG. 21 illustrates AFM images (upper) and their gray value profiles (lower) of select PC/tie/P(VDF-HFP) 65-layer samples with 103 nm tie layer thickness.

It is evident that the tie layer materials in addition to the tie layer thickness are critical parameters for the determination of the resulting breakdown properties. Since the tie layers were expected to have different degrees of interaction to the PC and P(VDFHFP) layers, the nature of the interphase/interface between these materials is an important structural parameter that may directly influence the resulting breakdown properties. AFM was used to quantify the tie layer thickness and attempt to observe the layer interphase/interface in select PC/tie/P(VDF-HFP) multilayered samples. Representative AFM images for the PC/tie/P(VDF-HFP) 65-layer samples with 25 and 103 nm PMMA, SAN30, and PETG tie layers are shown in FIG. 20 and FIG. 21, respectively.

For the samples with 25 nm nominal tie layer thickness (FIG. 20), the layer interface appeared diffused with no distinct tie layer material being observed for both PMMA and PETG tie layers. As mentioned in the previous section, PMMA layers were fully interdiffused into both PC (light layers) and P(VDF-HFP) (dark layers). PETG is highly miscible with PC and immiscible with P(VDF-HFP); therefore, for the 25 nm PETG tie layers, it was assumed the PETG was completely interdiffused into the PC layers, with very little material (<5 nm) diffused into the P(VDF-HFP) layers. For the 25 nm SAN30 tie layer sample, the interface appeared sharp with a discrete SAN30 tie layer material being observed between the PC and P(VDF-HFP). The measured layer thickness of the SAN30 tie layers was around 20-30 nm, which matched closely to the nominal tie layer thickness. The AFM images were analyzed using Image J software to obtain a contrast profile indicating relative gray values across the images. For the PC/PMMA/P(VDF-HFP) system, the profile exhibited the broadest transition between the PC (high gray value) and P(VDF-HFP) (low gray value) layers. For the PC/PETG/P(VDF-HFP) system, the tie layers were mostly diffused into the PC layers, however, a sharp transition between P(VDF-HFP) and PC was observed due to poor miscibility between PETG and P(VDF-HFP). For SAN30 system, the SAN30 tie layers (highest gray value) were observed in between PC and P(VDF-HFP) with steep transitions occurring in both PC/SAN30 and P(VDF-HFP)/SAN30 boundaries due to the lower interaction of SAN30 with both PC and P(VDF-HFP).

In samples with larger 103 nm tie layers (FIG. 21), all of the samples exhibited discrete tie layers from the AFM images, even in the samples with PMMA tie layers. Consistent with AFM images, tie layers were also observed in the gray value profiles. However, the layer interfaces in the 103 nm PMMA tie layer samples did appear quite diffused into both dark P(VDF-HFP) layers and light PC layers, with measured PMMA tie layer thicknesses that are much lower than 103 nm. For the 103 nm PETG tie layer, the PETG tie layers diffused into mainly the PC layers due to its miscibility with PC. In these samples the interface between P(VDF-HFP) and PETG was still rather sharp. The discrete PETG tie layer thicknesses are lower than 103 nm. For the 103 nm SAN30 tie layer, the layer interface appeared rather sharp on both PC and P(VDF-HFP) interfaces. In addition, the measured tie layer thicknesses was around 100-130 nm, which matched well to the nominal tie layer thickness. An accurate measurement of the actual PMMA and PETG tie layer thickness in this sample was difficult due to the diffuse nature of the interphase regions; however, the PMMA and PETG tie layers did appear thinner when compared to the SAN30 systems with similar nominal tie layer thicknesses.

The observed structural features in these materials match the expected thermodynamic behavior/interactions between the materials. The PMMA tie material was expected to diffuse into both the PC and P(VDF-HFP) layers, causing the layer interphase to appear rather diffuse on both sides.

The PETG tie material was expected to diffuse into the PC layers rather than P(VDF-HFP) layers, causing the layer interphase to appear diffused on the PC side and sharp on the P(VDF-HFP) side. The SAN30 tie material was not miscible with either PC or P(VDF-HFP) and, thus, the layer interface is rather sharp on both sides. Theoretical simulation indicates that a broad interfacial region with gradient dielectric constant distribution along the layer thickness direction could lead to high breakdown strength. The breakdown and dielectric data in addition to the AFM images for PC/tie/P (VDF-HFP) confirms this conclusion. The PMMA tie layers diffuse into both PC and P(VDF-HFP) layers, forming a gradient change in PMMA tie layer composition and gradient dielectric constant distribution along the layer thickness direction. Therefore, the multilayer samples with PMMA as tie layers exhibited the largest enhancement in breakdown properties among all tie materials tested.

Figure 22:
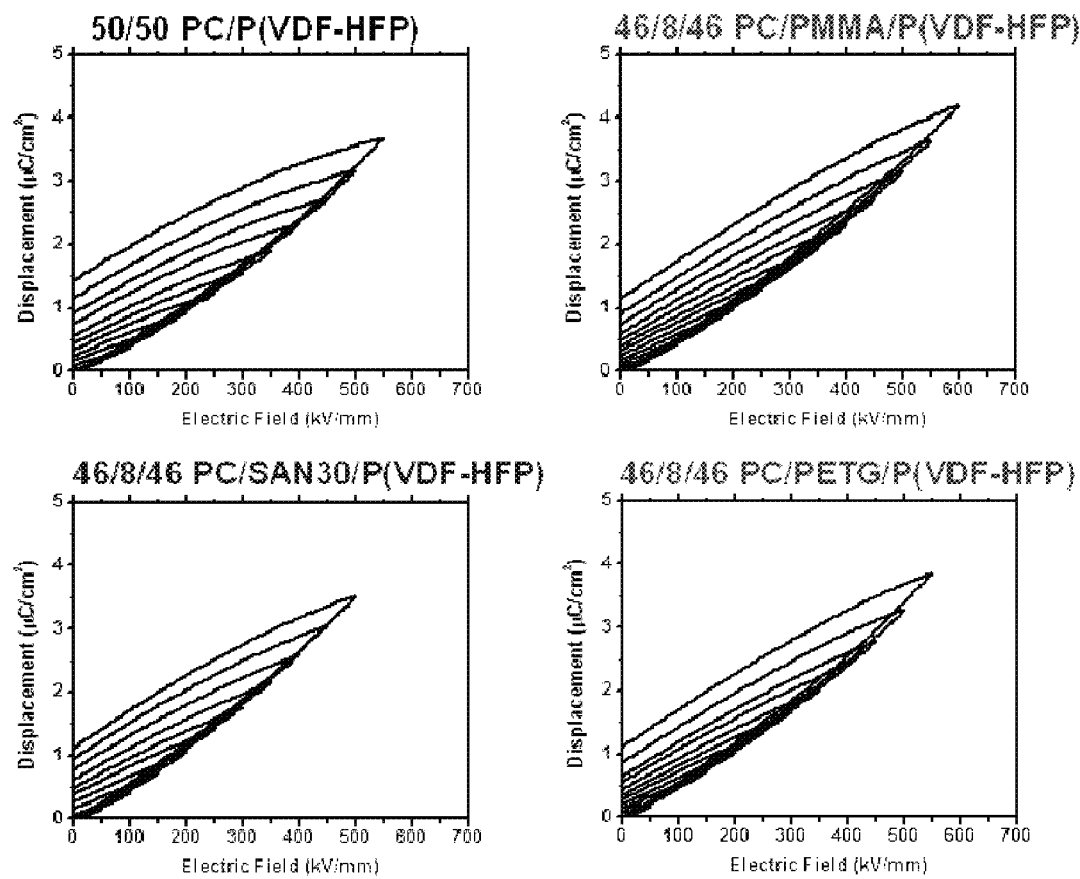
FIG. 22 illustrates the representative unipolar D-E polarization hysteresis loops for selected 46/8/46 PC/tie/P(VDF-HFP) 65-layer films.
Figure 23A:
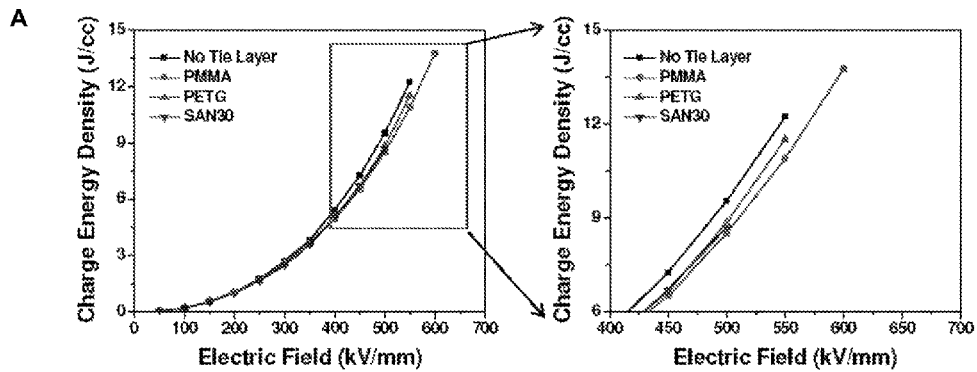
FIG. 23 illustrates a) charge energy density, b) discharge energy density, and c) loss energy density as a function of field for the various 46/8/46 PC/tie/P(VDF-HFP) 65-layer films in addition to the 50/50 PC/P(VDF-HFP) 33-layer film.
Figure 23B:
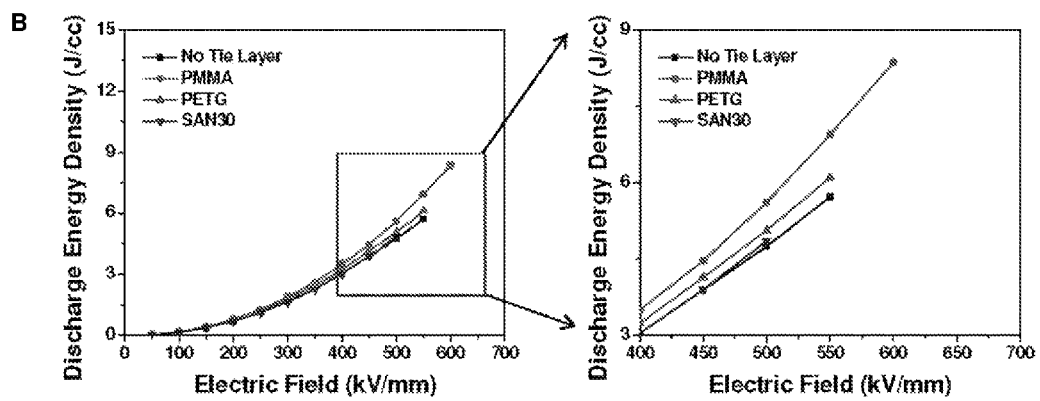
Figure 23C:
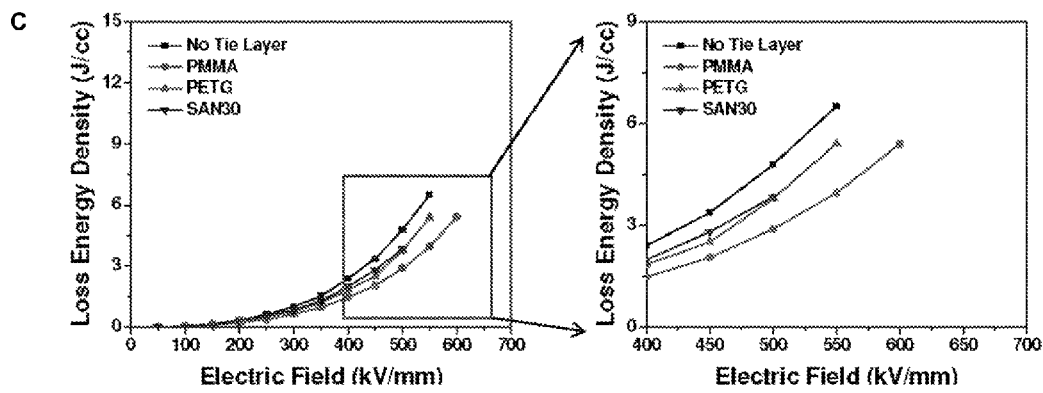

The layer interfaces have been reported to influence the hysteresis properties of PC/PVDF and PC/P(VDF-HFP) multilayered films. However, no emphasis has been put to study the effect of the interface/interphase on the resulting properties of these materials. The composition of 46/8/46 was chosen for 65-layer PC/tie/P(VDF-HFP) films for further study since samples exhibited maximum breakdown strength at this composition. The hysteresis properties were evaluated for the 46/8/46 PC/tie/P(VDF-HFP) 65-layer samples in addition to the 50/50 PC/P(VDF-HFP) 33-layer sample. Representative hysteresis curves are shown for the select systems in FIG. 22, with PMMA, SAN30, and PETG as the selected tie layers. The 50/50 PC/P(VDF-HFP) 33-layer film was also included for comparison, and all films had equal amounts of PC and P(VDF-HFP), with film thicknesses maintained at 10 μm. Both the hysteresis loop area and discharged energy density were calculated as a function of electric field for all of the samples and plotted in FIGS. 23(a)-(c). Quantifying the loop area verified that including a tie layer in the PC/P(VDF-HFP) samples effectively reduced the observed hysteresis behavior (see Table 2).

TABLE 2

Maximum discharge energy density and hysteresis property values at 500 kV/mm as a function of nominal tie layer thickness for the 65-layer 46/8/46 PC/tie/P(VDF-HFP) multilayer films

| Tie Material | Maximum Discharge Energy Density (J/cc) | Discharge Energy Density at 500 kV/mm (J/cc) | Loss Energy Density at 500 kV/mm (J/cc) |
|---|---|---|---|
| No tie | 5.72 | 4.75 | 4.79 |
| PMMA | 8.36 | 5.62 | 2.90 |
| PETG | 6.11 | 5.07 | 3.79 |
| SAN30 | 4.86 | 4.86 | 3.85 |

The largest reduction was observed in samples with the PMMA tie layers. Interestingly, the remaining tie layer systems all exhibited a marginally reduced hysteresis behavior. For the discharged energy density, the 65-layer PC/tie/P(VDF-HFP) samples generally possessed larger discharged energy densities at a constant electric field. The best systems contained PMMA possessed approximately 20% higher energy densities. In general, the PMMA tie layer system could also be measured at much higher electric fields, which also resulted in higher energy densities. These results correlated with the previously determined breakdown properties. In addition, these experiments also revealed that the PC/PMMA/P(VDF-HFP) 65-layer system possessed better hysteresis behavior as compared to the other two systems with PETG and SAN30 as tie layers. The cause of the reduction in hysteresis behavior in these systems was not clear; however, it was evident that modifying the layer interphase/interface in these systems had an impact on the hysteresis properties. To help clarify this point, low field dielectric spectroscopy for the various systems was used to probe the ion migration characteristics in these systems with various tie materials.

Referring to FIGS. 24(a)-(b), the dielectric constant and loss tangent of the dielectric constant was measured at 20° C. for the various 65-layer 46/8/46 PC/tie/P(VDF-HFP) systems in addition to the 33-layer 50/50 PC/P(VDF-HFP) control. One major peak was observed and related to $\alpha_c$ of P(VDF-HFP) around 50 Hz as shown in FIG. 24(b). The 65-layer PC/PETG/P(VDF-HFP) and PC/SAN30/P(VDF-HFP) systems in addition to the 33-layer PC/P(VDF-HFP) control exhibited ion migration peak below 1 Hz, however, no ionic peaks were detected in the frequency range tested (FIG. 24(b)). Another interesting feature—shown in FIG. 24(a)—was that the PMMA tie layer system had the highest dielectric constant at 20° C. A list of the dielectric constants for PC/tie/P(VDF-HFP) systems at 1 Hz is shown in the first column of Table 3.

TABLE 3

Measured and modeled dielectric constants of PC/tie/P(VDF-HFP) 46/8/46 multilayered films at 20° C., and effective dielectric constants of P(VDF-HFP) calculated from series model

| | Measured Dielectric Constant | Calculated Dielectric Constant[1] | Effective Dielectric Constant of P(VDF-HFP)[2] |
|---|---|---|---|
| 50/50 PC/P(VDF-HFP) | 4.46 | 4.49 | 10.80 |
| 46/8/46 PC/PMMA/P(VDF-HFP) | 4.98 | 4.42 | 29.60 |
| 46/8/46 PC/SAN30/P(VDF-HFP) | 4.56 | 4.30 | 16.42 |
| 46/8/46 PC/PETG/P(VDF-HFP) | 4.49 | 4.38 | 12.96 |

1 Hz was chosen because it is the frequency for DE hysteresis measurements and is well above the ionic relaxation peak. The second and third columns show the calculated dielectric constant and effective dielectric constant of P(VDF-HFP) based on equations below:

$$\frac{1}{\varepsilon_{calculated}} = \frac{0.08}{\varepsilon_{tie}} + \frac{0.46}{\varepsilon_{PC}} + \frac{0.46}{\varepsilon_{P(VDF-HFP)}} \quad (4)$$

$$\frac{0.46}{\varepsilon_{eff,P(VDF-HFP)}} = \frac{1}{\varepsilon_{Measured}} + \frac{0.88}{\varepsilon_{tie}} + \frac{0.46}{\varepsilon_{PC}} \quad (5)$$

where $\varepsilon_{calculated}$, $\varepsilon_{tie}$, $\varepsilon_{PC}$, $\varepsilon_{P(VDF-HFP)}$, and $\varepsilon_{eff,P(VDF-HFP)}$ are the calculated dielectric constant of 65-layer films, tie materials, PC control, P(VDF-HFP) control, and effective dielectric constant of P(VDF-HFP) layer, respectively. Equations 4 and 5 do not take into consideration the loss part of the dielectric constant. Equation 4 assumes that the intermix of the tie material with PC and P(VDF-HFP) does not change the dielectric constants of tie materials, PC and P(VDF-HFP). Equation 5 assumes that the dielectric constants of the tie materials and PC in the layered films are the same as in bulk. The dielectric constants of 10 Ohm PC, P(VDF-HFP), PMMA, SAN30, PETG films were measured to be 2.81, 11.20, 3.71, 2.90, and 3.40, respectively. The calculated effective dielectric constant was highest for the PMMA tie system. One speculation is that since PMMA was miscible with P(VDF-HFP), the PMMA material could act as a lubricating agent that loosens up the dipoles in P(VDF-HFP) layers. A similar phenomenon was reported in the literature where polyurethane (PU) chains acted as a lubricant agent and could facilitate easier polar chain rotation in PVDF. Another speculation is that PMMA can induce the formation of β-crystals in P(VDF-HFP), which has higher dielectric constant than α-crystals in bulk P(VDF-HFP).

The system with SAN30 tie material exhibited intermediate effective dielectric constant of P(VDF-HFP). Pure poly(acrylonitrile) (PAN) is considered partially miscible with P(VDF-HFP), therefore some level of interaction was expected for SAN30 and may result in a similar behavior although to a much smaller degree. For the system with PETG tie material, the effectively dielectric constant was very close to the series model due to very little interaction between PC and P(VDF-HFP). From the effective dielectric constant of P(VDF-HFP) data of the various tie materials, it is concluded that the interaction between the P(VDF-HFP) and the tie material played the significant role rather than the interaction with PC.

Figure 25:
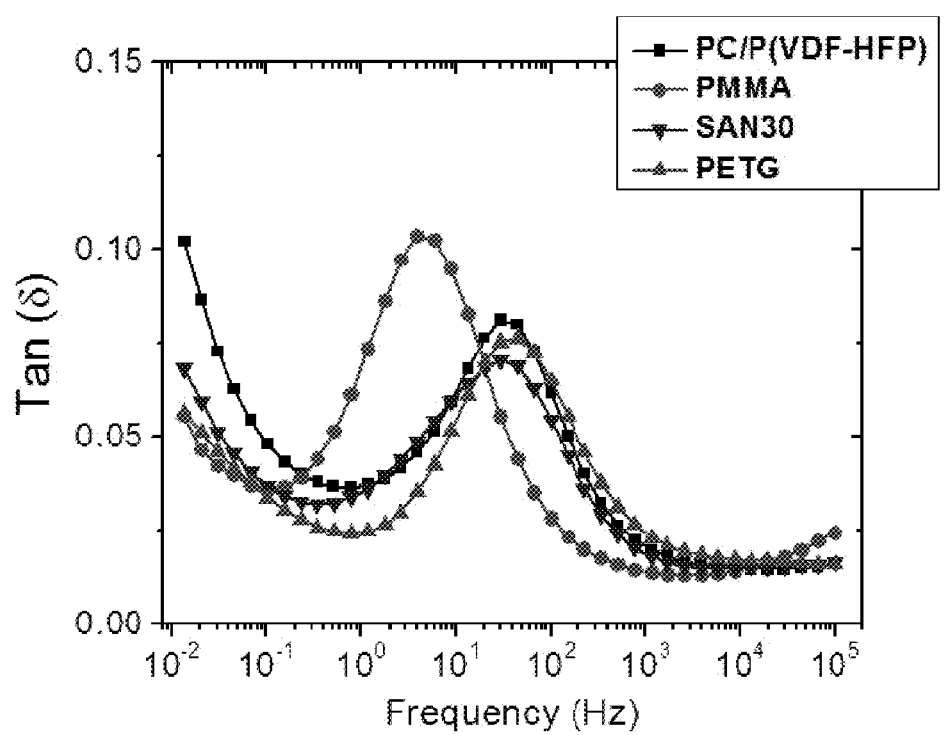
FIG. 25 illustrate dielectric loss tangent as a function of frequency for various 46/8/46 PC/tie/P(VDF-HFP) 65-layer films in addition to the 50/50 PC/P(VDF-HFP) 33-layer film.

To gain a better understanding on the ion migration behavior in these materials, the low frequency dielectric spectroscopy was measured for the various 46/8/46 PC/tie/P(VDF-HFP) 65-layer samples in addition to the 50/50 PC/P(VDF-HFP) 33-layer sample at a measuring temperature of 100° C. to drive the ion migration peak to higher frequencies, which is plotted in FIG. 25. The data for the 50/50 PC/P(VDF-HFP) sample clearly shows a peak centered at 30 Hz, which was assigned to the ion migration in the P(VDF-HFP) layers. The addition of a tie layer had a varying effect on this ionic peak. For the PETG and SAN30 tie layers, the ionic peak was centered around 40 Hz and 25 Hz, respectively. All of the changes were minor in these systems with PETG, and SAN30 tie materials. However, the samples with PMMA tie layers produced a dramatically different result. The ionic peak in these samples shifted to lower frequencies, which was around 4 Hz. This reduction indicated that the ion migration was suppressed in 65-layer PC/PMMA/P(VDF-HFP) which correlates to the reduction in the hysteresis loop area for these 65-layer PC/PMMA/P(VDF-HFP). One possibility is the localized mixing of PMMA into P(VDF-HFP) in the interphase regions may be tying up these ionic species, making them more immobile under an applied electric field. The other possibility is the PMMA molecules intermix with the amorphous part of P(VDF-HFP), making P(VDFHFP) chains harder to move and effectively excluding the ions and reducing the ion mobility.

While a preferred embodiment of the invention has been illustrated and described, it shall be understood that the invention is not limited to this embodiment. Numerous modifications, changes and variations will be obvious for those skilled in the art, without departing from the scope of the invention as described by the appended claims. The multilayer polymer dielectric film is primarily intended to be used in film capacitors for devices, such as defibrillators, but it could be used anywhere where higher efficiency, faster charge time, and larger number of charge-discharge cycles are desired compared to conventional film capacitors and batteries.

All publications and patents mentioned in the above specification are herein incorporated by reference.

Having described the invention, the following is claimed:

1. A multilayer dielectric film comprising:
a stack of coextruded, alternating first dielectric layers, second dielectric layers, and tie layers interposed between the first and second dielectric layers, the stack receiving and storing an electrical charge; the first dielectric layers comprising a first polymer material, the second dielectric layers comprising a second polymer material, the tie layers comprising a third polymer material; the first dielectric layers and the tie layers defining first interfaces between the layers and the second dielectric layers and tie layers defining second interfaces between the layers, wherein the first interfaces and the second interfaces constitute interphase regions in which the tie layers are interdiffused into the first dielectric layers and the second dielectric layers, respectively, such that the multilayer polymer dielectric film exhibits at least one of a higher breakdown strength and a higher energy density than the breakdown strength and energy density of the first and second dielectric layers.

2. The multilayer polymer dielectric film of claim 1, the third polymer material being at least partially miscible with the first polymer material and the second polymer material.

3. The multilayer polymer dielectric film of claim 1, the first polymer material, second polymer material, and third polymer material being different from one another.

4. The multilayer polymer dielectric film of claim 1, the first polymer material having at least one of an energy density and permittivity greater than the second polymer material, and the second polymer material having a breakdown strength greater than the first polymer material.

5. The multilayer polymer dielectric film of claim 1, the tie layers adhering the first dielectric layers and the second dielectric layers.

6. The multilayer polymer dielectric film of claim 1, comprising about 5 to about 500,000 layers alternating between the first dielectric layers, the second dielectric layers, and the tie layer.

7. The multilayer polymer dielectric film of claim 1, the first dielectric layers and second dielectric layers being fabricated by multilayer coextrusion forced assembly processes.

8. The multilayer polymer dielectric film of claim 1, the number of layers and the absolute and relative layer thickness of each layer being adjusted to vary the breakdown strength of the dielectric film.

9. The multilayer polymer dielectric film of claim 1 being axially oriented in at least one direction substantially parallel to a surface of the film at a ratio effective to increase the breakdown strength of the film.

10. The multilayer polymer dielectric film of claim 1, at least one of the first polymer material, the second polymer material, and the third polymer material further comprising a filler to improve the dielectric properties of the first polymer material and/or the second polymer material and/or the third polymer material.

11. The multilayer polymer dielectric film of claim 1, the stack forming a capacitor that receives and stores electrical charge.

12. A capacitor comprising:
a stack of coextruded, alternating first dielectric layers, second dielectric layers, and tie layers interposed between the first and second dielectric layers, the stack receiving and storing an electrical charge; the first dielectric layers comprising a first polymer material, the second dielectric layers comprising a second polymer material, the tie layers comprising a third polymer material; the first dielectric layers and the tie layers defining first interfaces between the layers and the second dielectric layers and tie layers defining second interfaces between the layers, wherein the first interfaces and the second interfaces constitute interphase regions in which the tie layers are interdiffused into the first dielectric layers and the second dielectric layers, respectively, such that the stack exhibits at least one of a higher breakdown strength and a higher energy density than the breakdown strength and energy density of the first and second dielectric layers.

* * * * *

UNITED STATES PATENT AND TRADEMARK OFFICE
CERTIFICATE OF CORRECTION

PATENT NO. : 9,558,888 B2  
APPLICATION NO. : 14/082798  
DATED : January 31, 2017  
INVENTOR(S) : Eric Baer et al.

Page 1 of 1

It is certified that error appears in the above-identified patent and that said Letters Patent is hereby corrected as shown below:

On the Title Page

(73) Assignee, add --Case Western Reserve University, Cleveland, OH (US)--.

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*